US012202113B2

(12) United States Patent
Carrier et al.

(10) Patent No.: US 12,202,113 B2
(45) Date of Patent: Jan. 21, 2025

(54) FASTENER DRIVER TOOL WITH RAFTER HANGER

(71) Applicant: Kyocera Senco Industrial Tools, Inc., Cincinnati, OH (US)

(72) Inventors: Alexander L. Carrier, Columbus, OH (US); Alexander D. Green, Cincinnati, OH (US); David O. Shumate, Lawrenceburg, IN (US)

(73) Assignee: Kyocera Senco Industrial Tools, Inc., Cincinnati, OH (US)

( * ) Notice: Subject to any disclaimer, the term of this patent is extended or adjusted under 35 U.S.C. 154(b) by 28 days.

(21) Appl. No.: 17/471,848

(22) Filed: Sep. 10, 2021

(65) Prior Publication Data

US 2022/0080572 A1 Mar. 17, 2022

Related U.S. Application Data

(60) Provisional application No. 63/084,782, filed on Sep. 29, 2020, provisional application No. 63/077,359, filed on Sep. 11, 2020.

(51) Int. Cl.

*B25C 7/00* (2006.01)
*B25C 1/04* (2006.01)
*B25C 5/13* (2006.01)

(52) U.S. Cl.

CPC ................ *B25C 7/00* (2013.01); *B25C 1/047* (2013.01); *B25C 5/13* (2013.01)

(58) Field of Classification Search

CPC .................................. B25C 7/00; B25C 1/047
See application file for complete search history.

(56) References Cited

U.S. PATENT DOCUMENTS

| | | | |
|---|---|---|---|
| D562,664 S | 2/2008 | Buck | |
| 7,611,037 B1 | 11/2009 | Bazzano | |
| 7,942,299 B2 | 5/2011 | Steinbrunner et al. | |
| 8,322,006 B1 | 12/2012 | Kodi | |
| 2007/0102176 A1* | 5/2007 | Liao | B25F 5/00 173/171 |
| 2007/0277990 A1 | 12/2007 | Steinbrunner | |
| 2009/0277939 A1 | 11/2009 | Ou | |
| 2009/0278012 A1* | 11/2009 | Okouchi | B25F 5/02 248/304 |
| 2013/0043295 A1 | 2/2013 | Gathers | |
| 2014/0097326 A1* | 4/2014 | Brendel | A45F 5/021 248/692 |
| 2018/0283443 A1 | 10/2018 | Blaess et al. | |

OTHER PUBLICATIONS

International Search Report, PCT/US2021/049845, 13 pages (Feb. 3, 2022).

* cited by examiner

*Primary Examiner* — Veronica Martin
(74) *Attorney, Agent, or Firm* — Frederick H. Gribbell; Russell F. Gribbell; William E. Crouse

(57) ABSTRACT

A fastener driving tool with a hanger attachment that is rotatable around the handle of the tool. The hanger is configured to fit a 2×4 rafter or joist on either side of the tool. The rotatable hanger allows for this flexibility in hanging the tool securely on a jobsite. The hanger has a plurality of designed stop positions (detents) around the handle. A user rotating the hanger around the handle will feel the hanger become more secure at one of these designed stop (detent) positions.

18 Claims, 30 Drawing Sheets

FASTENER DRIVER TOOL WITH RAFTER HANGER

CROSS-REFERENCE TO RELATED APPLICATIONS

The present application claims priority to provisional patent application Ser. No. 63/077,359, titled "FASTENER DRIVER TOOL WITH RAFTER HANGER," filed on Sep. 11, 2020, and to provisional patent application Ser. No. 63/084,782, titled "FASTENER DRIVER TOOL WITH RAFTER HANGER," filed on Sep. 29, 2020.

TECHNICAL FIELD

The technology disclosed herein relates generally to linear fastener driving tools and is particularly directed to portable tools that drive staples, nails, or other linearly driven fasteners having a hanger for hanging the tool on a rafter or other object. The technology is specifically disclosed as a fastener driving tool having a rotatable hanger so that the operator of the tool may hang the tool on a 2×4 rafter or similar sized workpiece at the jobsite. The rotatable hanger swivels around the handle portion of the fastener driving tool, enabling a user to hang the tool on a 2×4 rafter or joist on either side of the tool.

In a first embodiment, an air powered fastener driving tool, having a magazine attached near the centerline of the tool, includes a rotatable hanger. This rotatable hanger is attached to an end cap near the tool's handle, and may be swiveled around the handle. The rotatable hanger is large enough to fit a 2×4 structural member (e.g., a rafter or joist). The user may rotate the hanger to either side of the tool, and may then hang the tool on the 2×4.

In a second embodiment, a gas spring fastener driving tool, having a magazine attached to one side of the tool, includes a rotatable hanger. This rotatable hanger is attached to a groove in the tool's handle, and may be swiveled around the handle. The rotatable hanger is large enough to fit a 2×4 structural member. The user may rotate the hanger to either side of the tool, and may then hang the tool on the 2×4.

In a third embodiment, a fastener driving tool includes a rotatable hanger. This rotatable hanger is attached to an end cap near the tool's handle, and may be swiveled around the handle. The rotatable hanger exhibits a first annular bearing surface having a plurality of detents. The rotatable hanger also has a second annular bearing surface having a plurality of outward facing protrusions, and this second annular bearing surface mates to the first annular bearing surface. A user may rotate the rotatable hanger around the handle, and when one of the plurality of outward facing protrusions slides into one of the plurality of detents, the rotatable hanger is "held" in place. This "hold" prevents the rotatable hanger from moving unless a greater force is applied by the user that would overcome the detent-producing friction.

STATEMENT REGARDING FEDERALLY SPONSORED RESEARCH OR DEVELOPMENT

None.

BACKGROUND

Handheld tools and, more specifically, powered fastener driving tools typically include, or may attach with, a hook (or hanger), so that the user can hold the tool in his or her belt, or perhaps hang on a workpiece on the jobsite. Typical hangers found in the prior art can include belt clips, belt hooks, or workpiece hangers. Some of these hangers also rotate around their attachment point.

However, an undesirable situation occurs when the hanger is only useful on one side of the tool. For example, a user may be securing a workpiece and only have a place to hang his or her tool on the left side, but the tool only has a right side hanger. The user is then forced into some unconventional contortions to hang the tool, or may not be able to hang the tool at all. In either case, the user risks dropping the tool. Depending on the jobsite conditions, that droppage could range from a broken tool to a harmful accident.

There are some conventional fastener driving tools available in the prior art that include a rotatable hanger. For example, the DeWalt DCN962 friction flywheel framer tool has a magazine that is not symmetric (i.e., not on the centerline of the tool), and has a hanger with clearance for a 2×4 work piece, but on only one side of the tool. There is no such clearance on the opposite side of that tool.

Another example tool is the Rigid R350CHE air tool framer, which exhibits a magazine that is not symmetric (not on the centerline) and its hanger has no clearance for a 2×4 work piece on either side of the tool. The hanger on this Rigid tool is located between the cap and the handle of the tool.

Yet another example tool is the Senco FinishPro 16XP (sold by Kyocera Senco Industrial Tools, Inc.), which has a hanger that has no clearance for a 2×4 work piece on either side. (Its hanger is more of a belt hook, than a hanger.) The Senco FinishPro hanger is located between the cap and the handle of the tool. Still another example is the Senco JoistPro 250XP (sold by Kyocera Senco Industrial Tools, Inc.) that has a hanger located at the air fitting of the tool. The Senco JoistPro hanger has clearance for a 2×4 work piece, but only on one side of the tool.

Yet still another example of a conventional tool known in the art is the Max SN883CH/34 air tool framer. This Max tool does not have a hanger, but it does exhibit an asymmetric magazine (i.e., the magazine is not on the centerline of the tool).

SUMMARY

Accordingly, it is an advantage of the present technology to provide a fastener driving tool that includes a rotatable hanger such that the tool can be securely hung on a 2×4 structural member on either side of the tool.

It is another advantage of the present technology to provide an air fastener driving tool that includes a rotatable hanger that rotates around a centerline of the tool such that the hanger can be positioned on either side of the tool providing a substantially symmetric gap, so that the tool can be securely hung on a 2×4 structural member on either side of the tool.

It is yet another advantage of the present technology to provide a gas spring fastener driving tool that includes a rotatable hanger that rotates around a centerline of the tool such that the hanger can be positioned on either side of the tool providing a sufficient gap, so that the tool can be securely hung on a 2×4 structural member on either side of the tool.

It is still another advantage to provide a fastener driving tool that includes a rotatable hanger with a first bearing surface exhibiting a plurality of detent positions, a second bearing surface with a plurality of outward-facing protrusions that makes contact with the first bearing surface, so that the hanger can be rotated and "held" in place when one of the plurality of outward-facing protrusions slides into one of the plurality of detent positions.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, a fastener driving tool is provided, which comprises: an outer housing portion; a handle portion; a magazine that stores fasteners; a fastener exit portion; and a movable hanger that is rotatable around the handle portion; wherein: the hanger exhibits a minimum rotational travel from at least a first position at a first side of the tool to at least a second position at a second, opposite side of the tool; the hanger, if rotated to the first position, is sized and shaped to provide an open space between the hanger and the outer housing portion at the first side of the tool, and between the hanger and the handle portion at the first side of the tool, the open space having a minimum dimension of at least 1.5 inches in a first direction and of at least 3.5 inches in a second, perpendicular direction; and the hanger, if rotated to the second position, is sized and shaped to provide an open space between the hanger and the outer housing portion at the second side of the tool, and between the hanger and the handle portion at the second side of the tool, the open space having a minimum dimension of at least 1.5 inches in the first direction and of at least 3.5 inches in the second, perpendicular direction.

In accordance with another aspect, a fastener driving tool is provided, which comprises: an outer housing portion; a handle portion; a magazine that stores fasteners; a fastener exit portion; and a movable hanger that is rotatable about the handle portion; wherein: the hanger exhibits a minimum rotational travel from at least a first position at a first side of the tool to at least a second position at a second, opposite side of the tool; the hanger, if rotated to the first position, is configured to fit around at least a 1.5 inch-wide solid surface, if placed between an outer portion of the hanger and the outer housing portion, and between the outer portion of the hanger and the handle portion; and the hanger, if rotated to the second position, is configured to fit around at least a 1.5 inch-wide solid surface, if placed between an outer portion of the hanger and the outer housing portion, and between the outer portion of the hanger and the handle portion.

In accordance with yet another aspect, a method for hanging a fastener driving tool on a solid rectangular-shaped surface is provided, in which the method comprises the following steps: (a) providing a fastener driving tool, including: (i) an outer housing portion; (ii) a handle portion; (iii) a magazine that stores fasteners; (iv) a fastener exit portion; and (v) a movable hanger that is rotatable about the handle portion, the hanger including an extension portion that is configured to fit around at least a 1.5 inch surface of a solid rectangular-shaped object that exhibits two dimensions that are about 1.5 inches in width by about 3.5 inches in height; (b) rotating the hanger around the handle portion to a first rotational position at a first side of the tool, and hanging the tool on the solid rectangular-shaped object, using the extension portion of the hanger; and (c) later, rotating the hanger around the handle portion to a second rotational position at a second, opposite side of the tool, and hanging the tool on the solid rectangular-shaped object, using the extension portion of the hanger.

In accordance with still another aspect, a handle with a rotatable hanger for use in a fastener driving tool is provided, which comprises: (a) a rotatable hanger comprising: (i) a first portion including: (A) a rotatable ring portion, the ring portion including an inward-facing first bearing surface, the first bearing surface exhibiting a plurality of concave indentations located at predetermined spaced-apart positions around the first bearing surface; and (B) an extension portion that extends from the ring portion along a first direction, then bends to further extend along a second, substantially perpendicular direction; (ii) a second portion including: (A) an annular bearing that includes an outward-facing second bearing surface and an inward-facing third surface, the second bearing surface exhibiting a plurality of outward-facing projections, the second bearing surface facing toward the first bearing surface; (B) the plurality of outward-facing projections are located at predetermined spaced-apart positions around the second bearing surface; and (C) the third surface exhibiting at least one inward-facing protrusion located on the third surface; (b) a handle portion including a fourth surface, the fourth surface exhibiting at least one notch, the fourth surface facing toward the third surface; (c) wherein: (i) the second bearing surface mates to the first bearing surface; (ii) if the plurality of outward-facing projections are in contact with the first bearing surface at locations not at one of the plurality of concave indentations, then the first portion is allowed to rotate about the handle portion at the first and second bearing surfaces; and (iii) if the plurality of outward-facing projections are in contact with the first bearing surface at the plurality of concave indentations, then rotation between the third surface and the fourth surface is prevented.

In accordance with a further aspect, a fastener driving tool is provided, which comprises: an outer housing portion; a handle portion; a fastener exit portion; a movable hanger that is rotatable about the handle portion, the hanger including a first ring portion that exhibits a plurality of concave indentations spaced-apart along an inward-facing first bearing surface, and a second ring portion that exhibits a plurality of outward-facing flexible projections spaced-apart along an outward-facing second bearing surface; the first ring exhibiting a first extension portion that extends in a direction that is substantially perpendicular with respect to a longitudinal axis of the tool; and exhibiting a second extension portion that extends from the first extension portion in a direction that is substantially perpendicular with respect to the first extension portion; wherein: the first bearing surface mates to the second bearing surface, and the first ring is rotatable about the second bearing surface; the plurality of outward-facing projections mate to the plurality of concave indentations, if the first bearing surface is rotated to a detent position with respect to the second bearing surface; and if the first bearing surface is rotated to the detent position, then the outward-facing projections hold the first ring portion in place with respect to the second ring portion.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
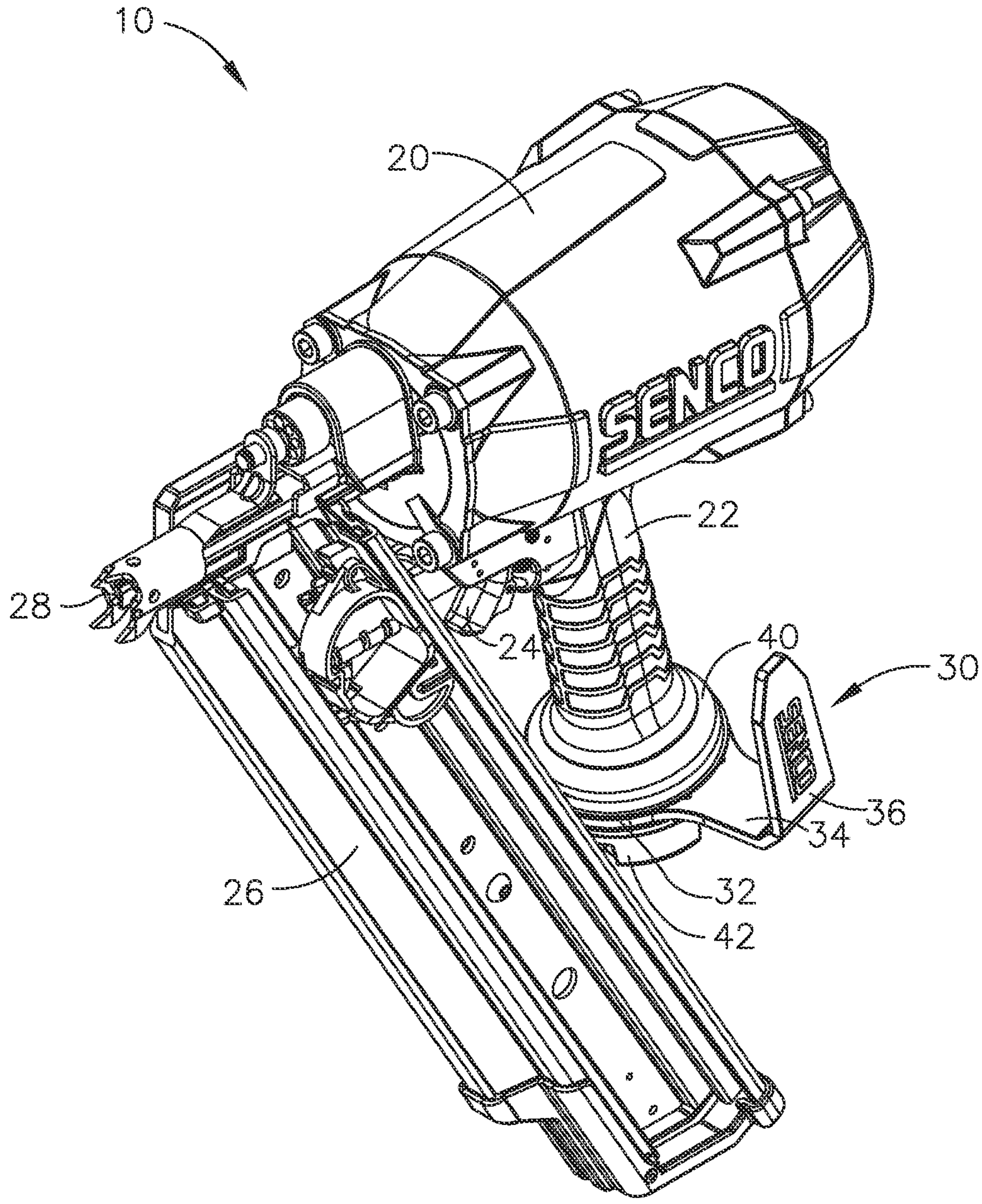
FIG. 1 is a front left perspective view of a fastener driving tool with a rotatable rafter hanger positioned on the left side of the tool, as constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," or "mounted," and variations thereof herein are used broadly and encompass direct and indirect connections, couplings, or mountings. In addition, the terms "connected" or "coupled" and variations thereof are not restricted to physical or mechanical connections or couplings. Furthermore, the terms "communicating with" or "in communications with" refer to two different physical or virtual elements that somehow pass signals or information between each other, whether that transfer of signals or information is direct or whether there are additional physical or virtual elements therebetween that are also involved in that passing of signals or information. Moreover, the term "in communication with" can also refer to a mechanical, hydraulic, or pneumatic system in which one end (a "first end") of the "communication" may be the "cause" of a certain impetus to occur (such as a mechanical movement, or a hydraulic or pneumatic change of state) and the other end (a "second end") of the "communication" may receive the "effect" of that movement/change of state, whether there are intermediate components between the "first end" and the "second end," or not. If a product has moving parts that rely on magnetic fields, or somehow detects a change in a magnetic field, or if data is passed from one electronic device to another by use of a magnetic field, then one could refer to those situations as items that are "in magnetic communication with" each other, in which one end of the "communication" may induce a magnetic field, and the other end may receive that magnetic field, and be acted on (or otherwise affected) by that magnetic field.

The terms "first" or "second" preceding an element name, e.g., first inlet, second inlet, etc., are used for identification purposes to distinguish between similar or related elements, results or concepts, and are not intended to necessarily imply order, nor are the terms "first" or "second" intended to preclude the inclusion of additional similar or related elements, results or concepts, unless otherwise indicated.

Referring now to FIG. 1, a first embodiment of a fastener driving tool is generally designated by the reference numeral 10. This tool 10 is mainly designed to linearly drive fasteners such as nails and staples. The tool 10 includes an outer housing 20, a handle portion 22, a magazine portion 26 for holding fasteners, an exit portion 28, and a trigger 24. The tool 10 also includes a hanger 30 mounted between an upper end cap portion 40 and a lower end cap portion 42. The hanger 30 has a rotatable ring portion 32, a first extending (about horizontal in this view) hanger portion 34, and a second extending (about vertical in this view) hanger portion 36. The movable hanger 30 is preferably manufactured as a single piece of material.

This first embodiment tool is preferably an air tool, which means that no electronic parts are included in this tool. The tool operates using pressurized air from an air hose that is typically attached at the lower end cap portion 42 (note that the hose attachment is not shown in FIGS. 1-9). This first embodiment tool preferably has its magazine 26 positioned along a centerline of the tool 10, as illustrated.

Figure 2:
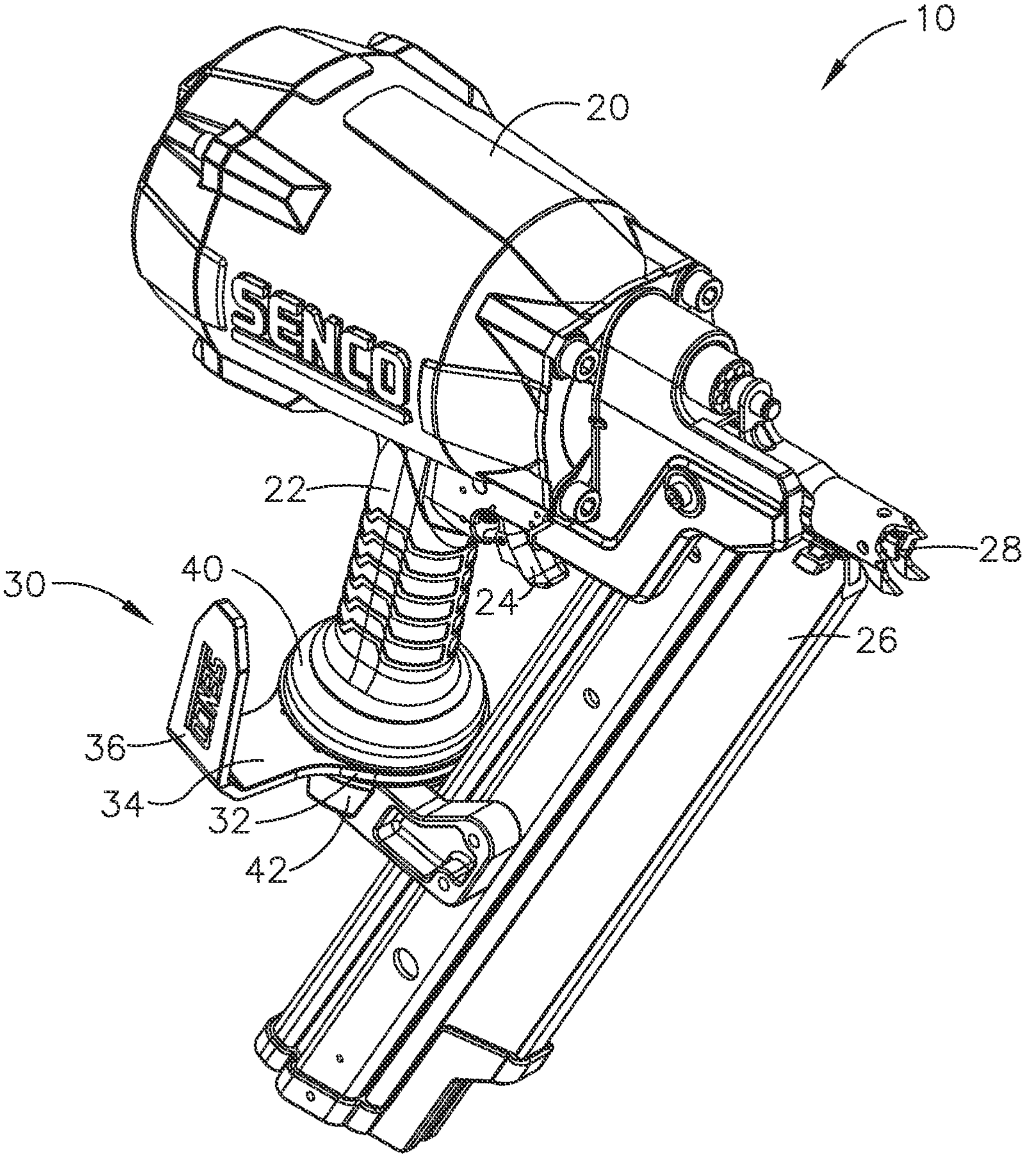
FIG. 2 is a front right perspective view of the fastener driving tool of FIG. 1, with the rotatable rafter hanger swiveled to the right side.

Referring now to FIG. 2, the tool 10 is depicted in a view opposite that illustrated in FIG. 1. Note that the hanger 30 is rotated to this opposite side.

The rotation of the hanger 30 around the handle 22 of the tool 10 allows the user to securely hang the tool on its right or left side. In an example scenario, a user is operating the tool 10 on the jobsite. The hanger 30 is rotated in the position illustrated in FIG. 1 (to the "left"). However, the user only has a place to hang the tool on his or her right side. The user can simply rotate the hanger 30 from the "left" position into a "right" position (the position depicted in FIG. 2), and then securely hang the tool on that right side.

The hanger 30 may be securely hung on a 2×4 rafter (see FIGS. 5-8). The open space between the tool and the (vertical) hanger portion 36 of the hanger 30 is large enough on both sides of the tool to accommodate a standard 2×4 piece of lumber (noting here that a 2×4 standard-sized lumber is actually 1.5 inches thick by 3.5 inches wide).

Figure 3:
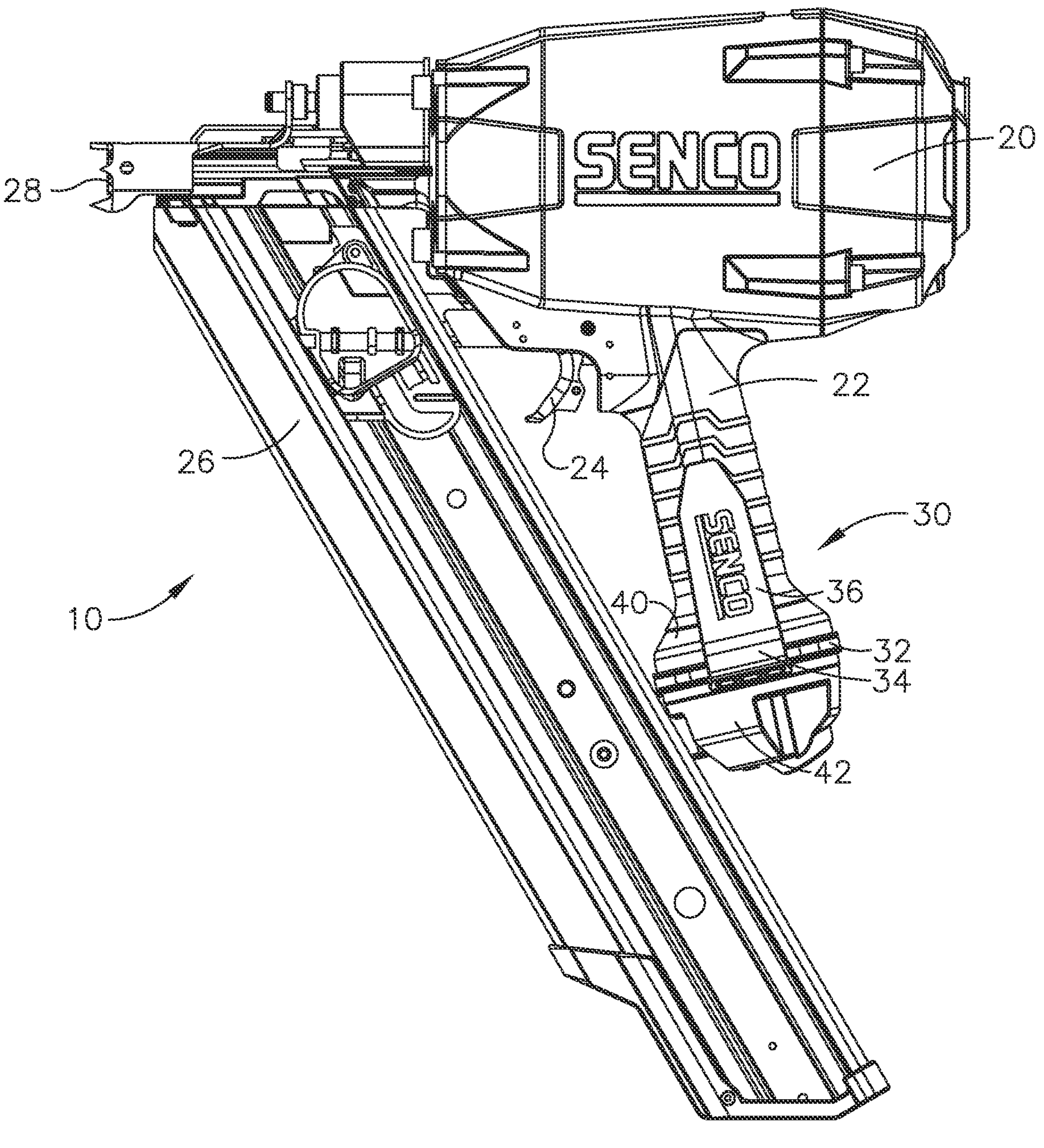
FIG. 3 is a left side view of the fastener driving tool of FIG. 1, with the rotatable rafter hanger swiveled to the left side.

Referring now to FIG. 3, the tool 10 is depicted with the hanger 30 on its "left" side. The hanger 30 rotates at the rotatable ring portion 32. The rotatable ring portion 32 is constrained between the upper end cap 40 and the lower end cap 42, thereby allowing only rotation along a flat plane around the handle 22 of the tool 10. The "tight" constrainment of the hanger 30 between the upper end cap 40 and the lower end cap 42 means that when a user hangs the tool, the air tool hanger 30 does not wobble or wiggle enough to fall off the 2×4. Even though the hanger 30 is rotatable, because it is so well constrained, the tool is able to securely hang on a 2×4.

Figure 4:
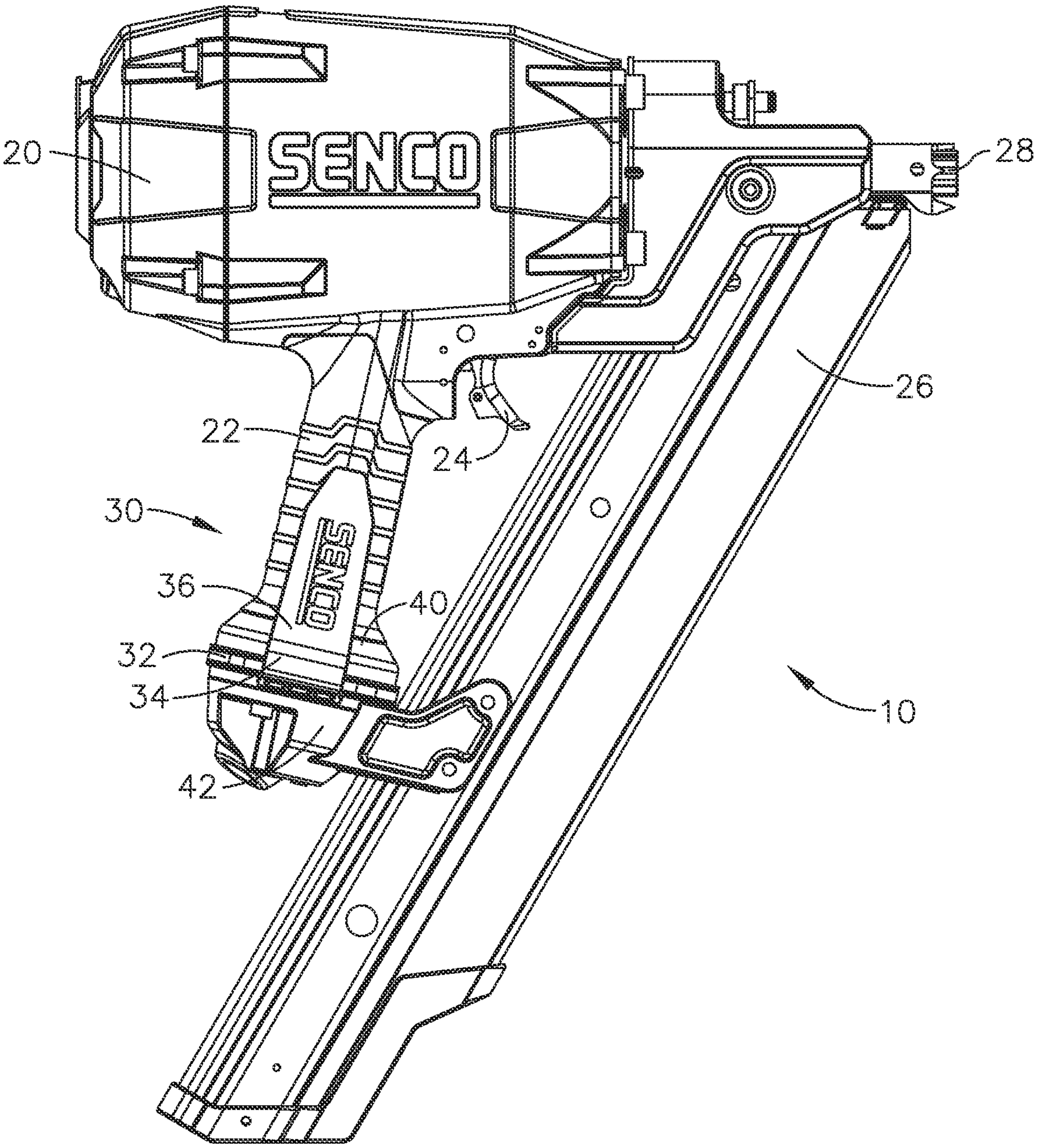
FIG. 4 is a right side view of the fastener driving tool of FIG. 1, with the rotatable rafter hanger swiveled to the right side.

Referring now to FIG. 4, the tool 10 is depicted with the hanger 30 on its "right" side. The hanger 30 has been rotated around the handle 22 (in a flat plane, as mentioned above) via the rotatable ring portion 32.

It is worth mentioning that the optimal location for the hanger 30 is on either side of the tool 10, as depicted in the drawings. However, the hanger 30 is rotatable from one side of the magazine 26 to the other, so there are a multitude of locations the hanger may be moved to. That being said, the optimal locations are the specifically designed rotatable positions where the tool 10 may be hung on a 2×4 rafter securely. In other rotatable positions, the hanger 30 may be impeded by part of the tool itself, such as the housing 20.

Figure 5:
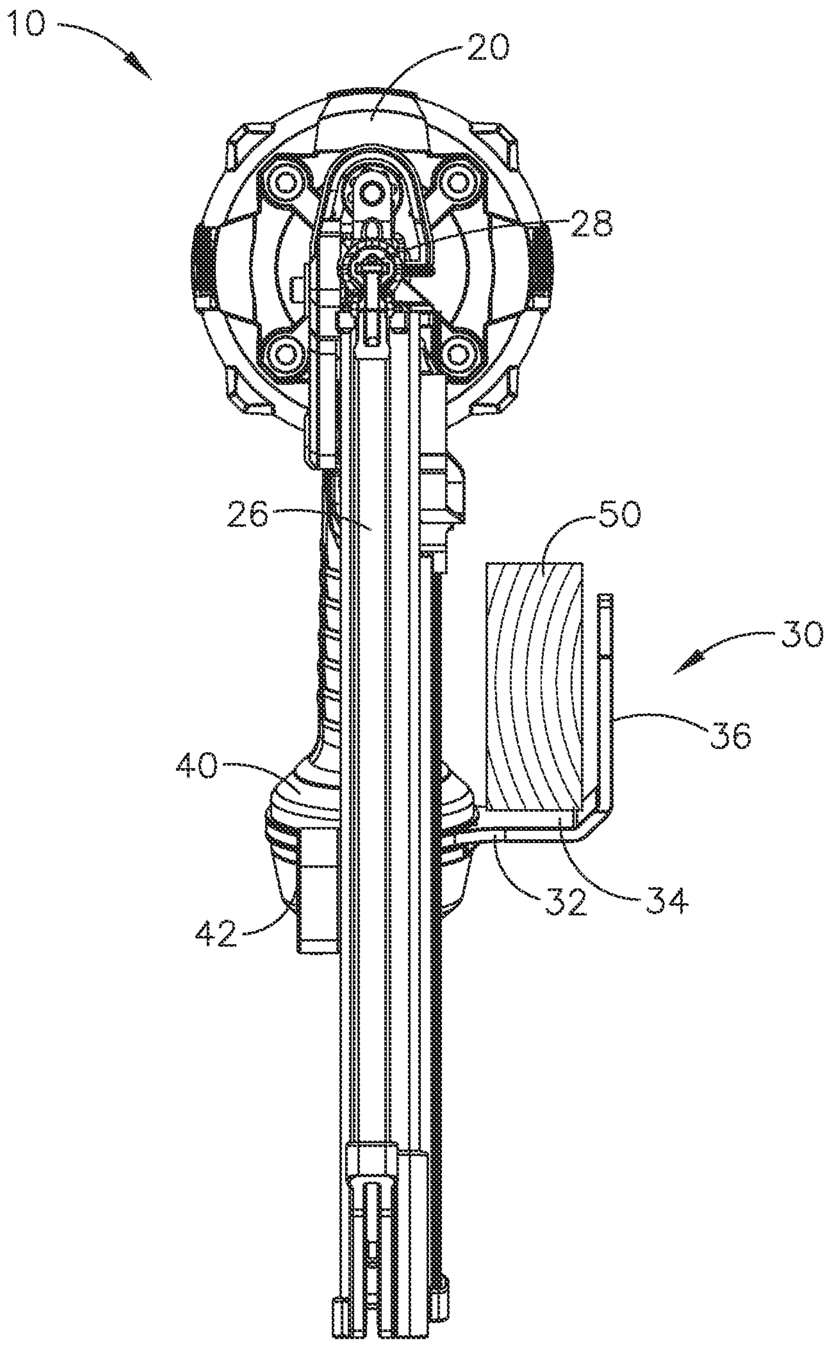
FIG. 5 is a front view of the fastener driving tool of FIG. 1, with the rotatable rafter hanger swiveled to the left side, and having a 2×4 rafter seated in the hanger.
Figure 6:
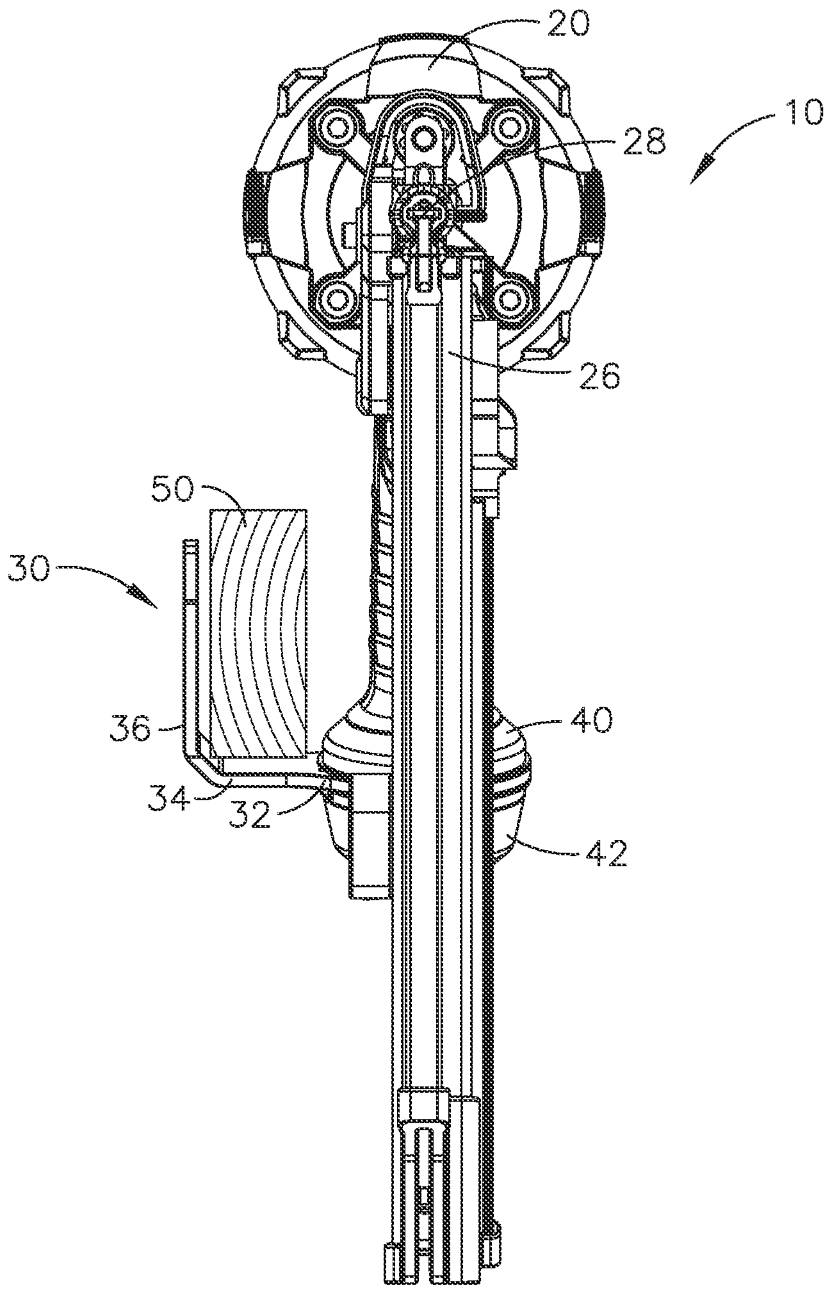
FIG. 6 is a front view of the fastener driving tool of FIG. 1, with the rotatable rafter hanger swiveled to the right side, and having a 2×4 rafter seated in the hanger.

Referring now to FIG. 5, a bottom view of the tool 10 is depicted with a 2×4 work piece 50 nested within the hanger 30. The 2×4 piece 50 is preferably a 2×4 wood rafter, but can be any material having a 2×4 dimension characteristic. FIG. 6 depicts the 2×4 work piece 50 nested in the hanger 30 on the opposite side of the tool 10.

It can be seen in FIGS. 5 and 6 that the hanger 30 creates an open space between its extending portions 34, 36 and the tool's main housing 20, and between its extending portions 34, 36 and the tool's handle 22 (including the handle's upper and lower end caps 40, 42). This open space is sufficiently large to emplace a standard 2×4 piece of lumber therewithin, which allows the tool to be "hung" (upside down) on such a piece of lumber. Furthermore, it can be seen that the first extending portion 34 entirely confines the lumber, whereas the second extending portion 36 at least partially confines the lumber. In other words, open space is entirely bounded by the hanger in the first direction (horizontal, in these views) and is at least partially bounded by the hanger in the second direction (vertical, in these views). It will be understood that the length dimension of the hanger's second extending portion 36 does not necessarily need to be completely as long as the 3.5 inch dimension of the 2×4 lumber piece so as to sufficiently confine it against the tool (i.e., to hold the tool in place, once the tool is hung on the lumber piece).

Figure 7:
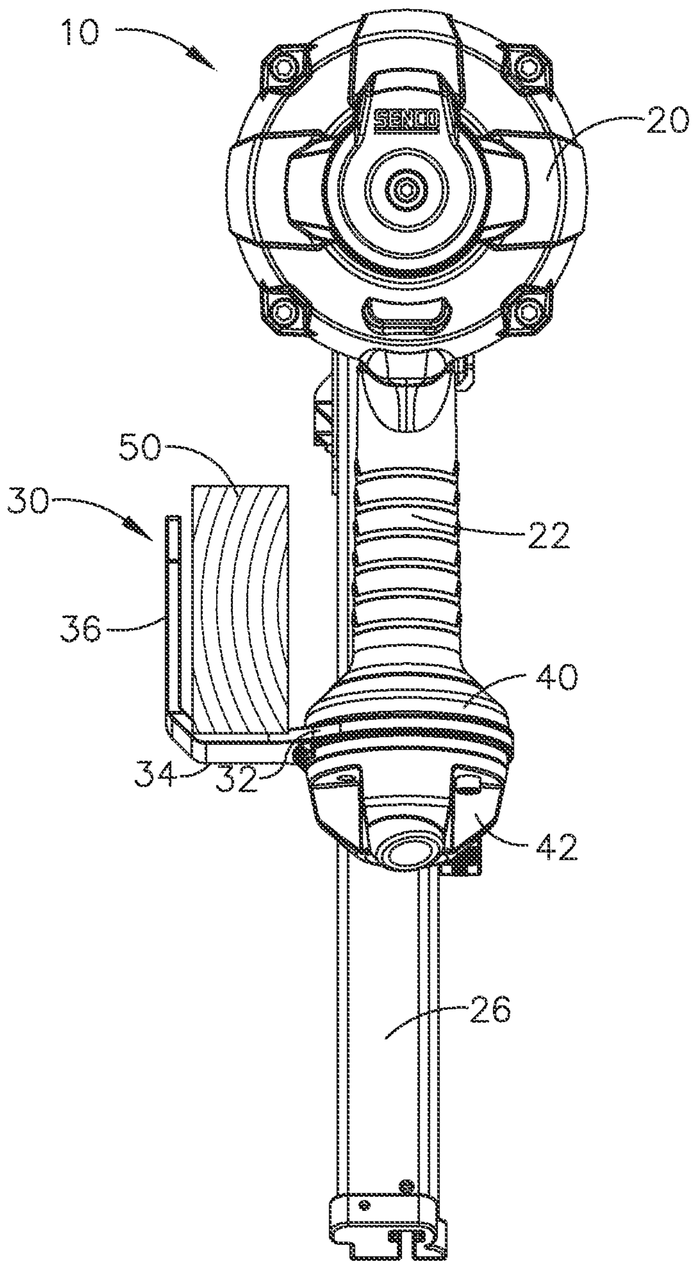
FIG. 7 is a rear view of the fastener driving tool of FIG. 1, with the rotatable rafter hanger swiveled to the left side, and having a 2×4 rafter seated in the hanger.
Figure 8:
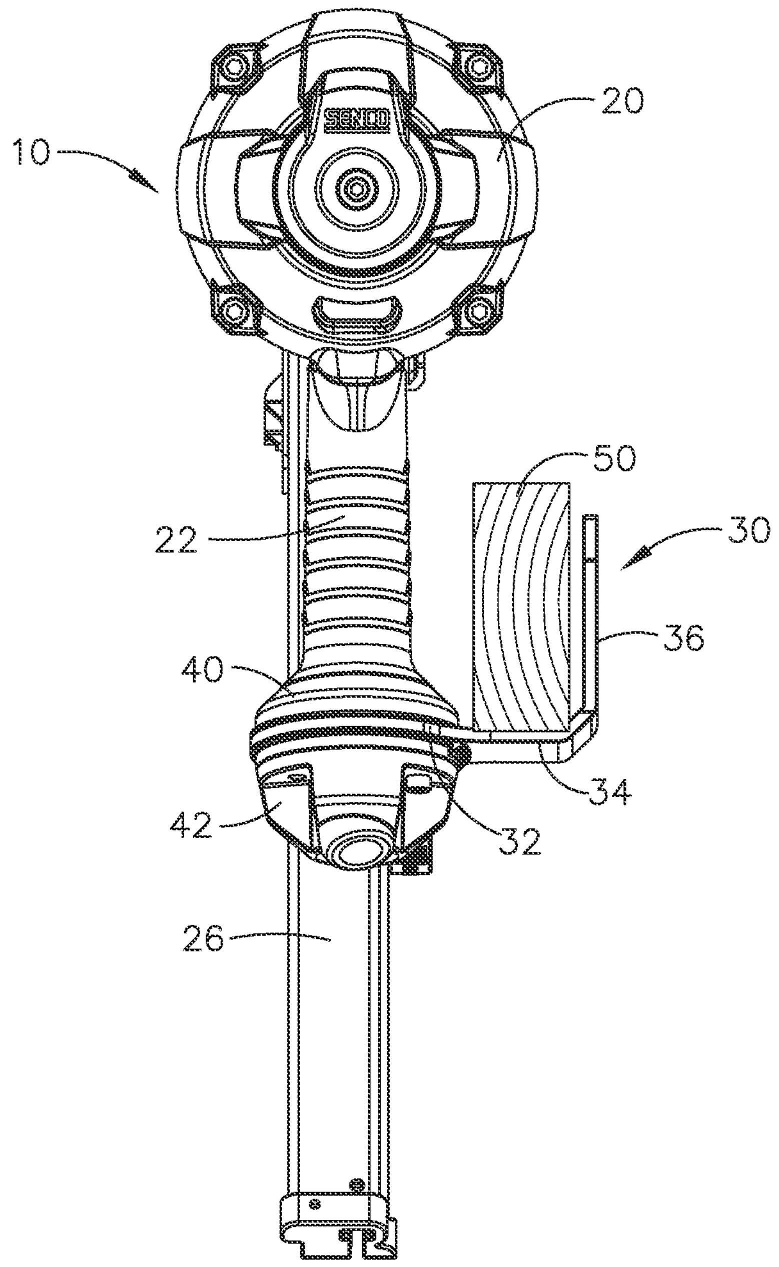
FIG. 8 is a rear view of the fastener driving tool of FIG. 1, with the rotatable rafter hanger swiveled to the right side, and having a 2×4 rafter seated in the hanger.

Referring now to FIG. 7, the tool 10 is depicted with the 2×4 work piece 50 nested in the hanger 30. FIG. 8 depicts the 2×4 work piece 50 nested in the hanger 30 on the opposite side of the tool 10.

Figure 9:
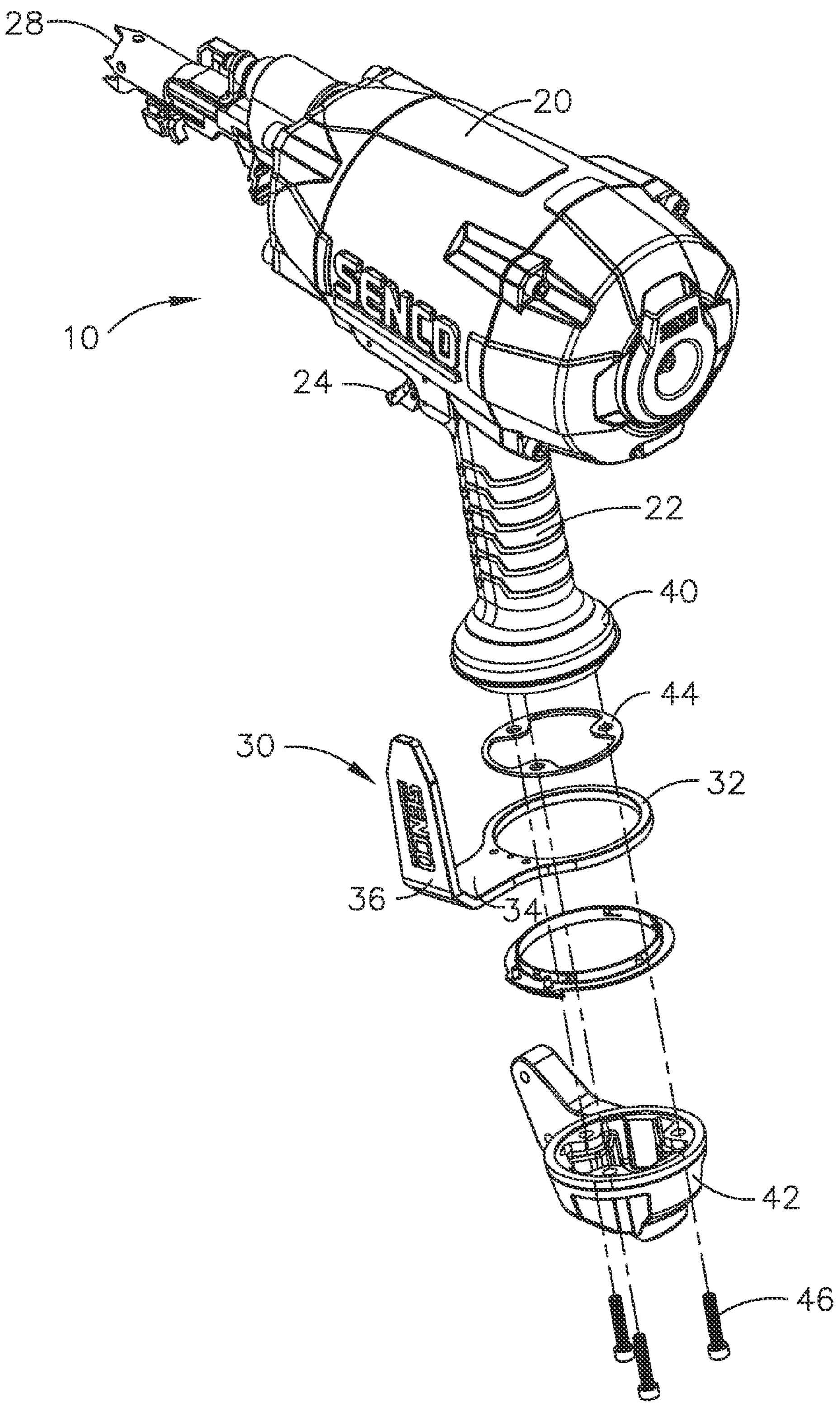
FIG. 9 is a partially exploded view of the rotatable rafter hanger subassembly of the fastener driving tool of FIG. 1.

Referring now to FIG. 9, the hanger 30 is depicted in a partially exploded view. The upper end cap portion 40 has a lip that the rotatable ring portion 32 slides onto. An end cap gasket 44 fits inside the lip of the end cap portion 40. The lower end cap portion 42 then mates to the rotatable ring portion 32 and the end cap gasket 44. A plurality of fasteners 46 is used to secure the lower end cap portion 42 to the end cap gasket 44 and the upper end cap portion 40. Once the lower end cap portion 42 is securely fastened to the upper end cap portion 40, the hanger 30 is secured, and may be rotated via the rotatable ring portion 32.

Figure 10:
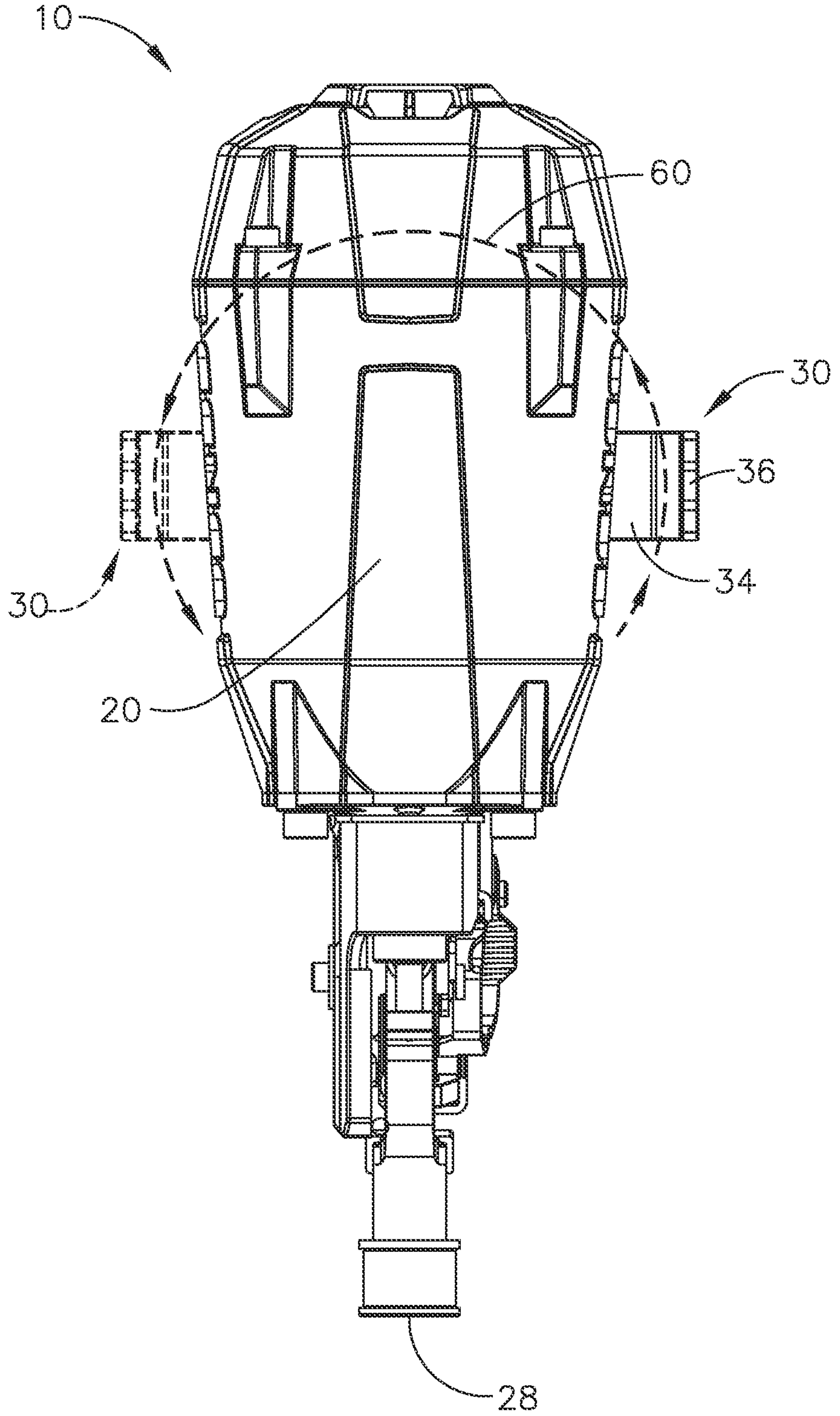
FIG. 10 is a top view of the rotatable rafter hanger of the fastener driving tool of FIG. 1, illustrating the rotatable arc of the hanger's travel around the handle.

Referring now to FIG. 10, the tool 10 is depicted showing the hanger's 30 rotational arc (or minimum rotational travel) 60 around the handle 22. This rotational arc is from at least a full-left-hand position on the left side of the tool, to at least a full-right-hand position on the opposite, right side of the tool. The hanger 30 has sufficient clearance beneath the housing 20 to easily rotate as shown in FIG. 10. Note how far the (vertical) hanger portion 36 is from the housing 20. This open space allows the tool 10 to be securely hanged onto a 2×4 rafter when a user is not operating the tool, because the open space has a minimum dimension of at least 1.5 inches in a first direction and of at least 3.5 inches in a second, perpendicular direction. It should be noted that the two positions illustrated in FIG. 10 are the designed "optimal positions" of the hanger 30. There is enough clearance around the housing 20 and the handle 22 for the hanger 30 to rotate until it touches (or almost touches) the magazine 26 on either side of the tool 10. The hanger 30 may be rotated underneath the rear of the housing 20 as well.

Figure 29:
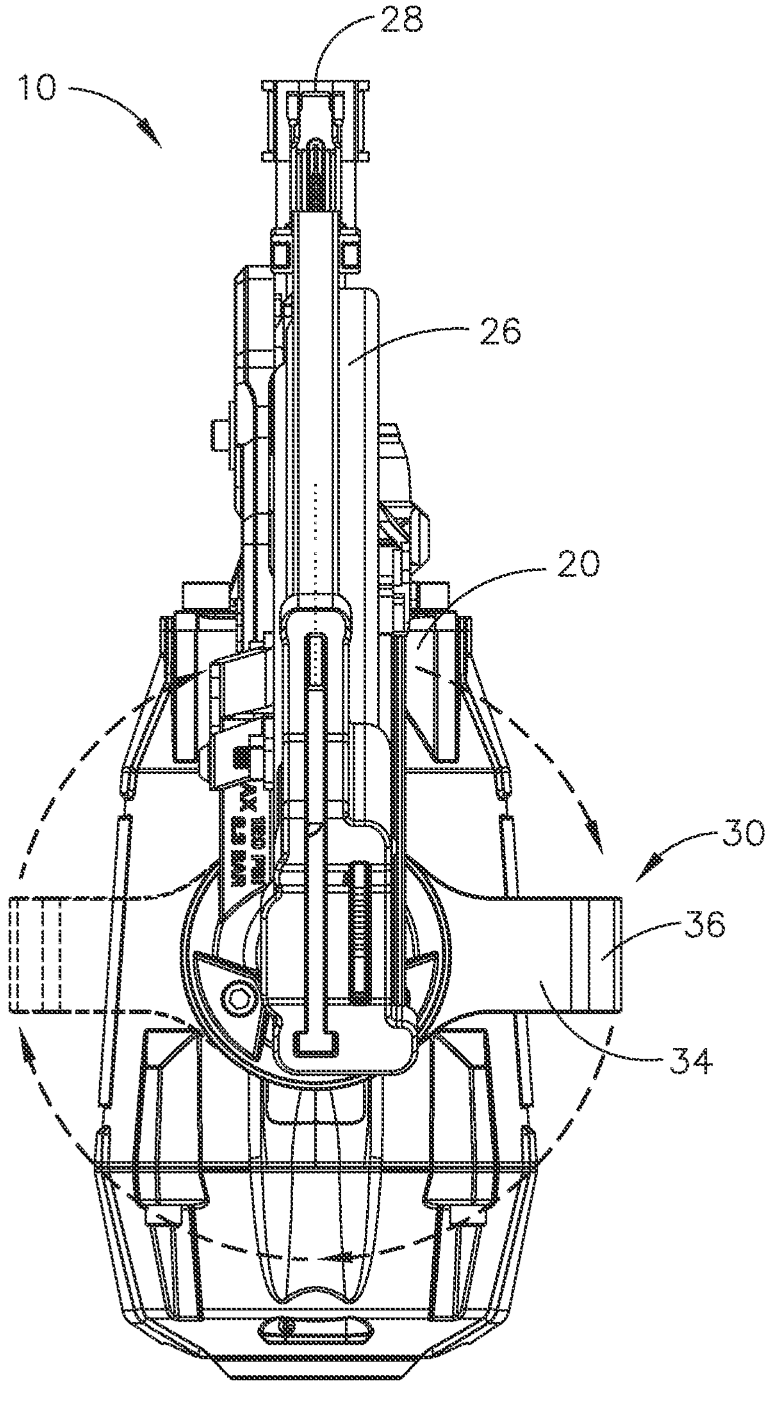
FIG. 29 is a rear view of the rotatable rafter hanger of the fastener driving tool of FIG. 1, illustrating the rotatable arc of the hanger's travel around the handle.

As can be seen on FIGS. 5-8, the magazine 26 extends along the centerline of the tool 10; thus, the magazine 26 is symmetrical with the major portions of the tool 10. This symmetrical attribute allows the hanger 30 a large arc of rotation about the tool 10, as illustrated in FIGS. 10 and 29.

Figure 11:
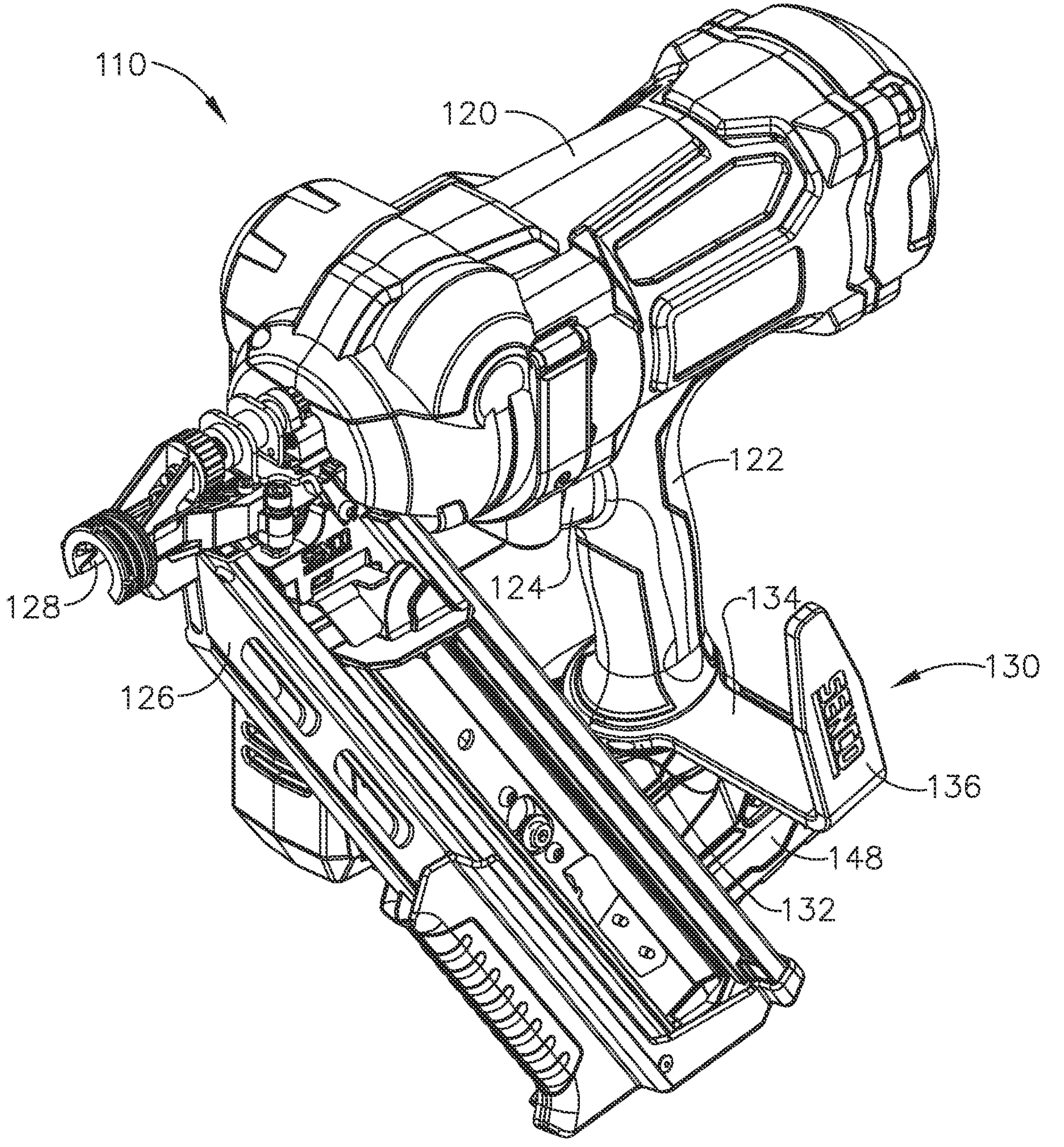
FIG. 11 is a front left perspective view of a first alternate embodiment fastener driving tool with a rotatable rafter hanger on the left side, as constructed according to the principles of the technology disclosed herein.

Referring now to FIG. 11, a second embodiment of a fastener driving tool is generally designated by the reference numeral 110. This tool 110 is mainly designed to linearly drive fasteners such as nails and staples. The tool 110 includes an outer housing 120, a handle portion 122, a magazine portion 126 for holding fasteners, an exit portion 128, and a trigger 124. The tool 110 also includes a hanger subassembly (S/A) 130 mounted on an annular groove 140 (see FIG. 19) in the handle portion 122. The hanger S/A 130 has a two-piece rotatable ring portion 132, a first extending (about horizontal in this view) hanger portion 134, and a second extending (about vertical in this view) hanger portion 136. A battery pack 148 is attached beneath the handle portion 122, and provides electrical power to the tool 110.

This second embodiment tool is preferably a gas-spring tool, which means that the tool has a pressure chamber for permanently containing pressurized gas that is re-used for multiple driving strokes. (There is no air hose connector for this tool.) An example of a gas spring tool is manufactured by Kyocera Senco Industrial Tools, Inc., and is patented under U.S. Pat. No. 8,011,547. Generally, the tool operates by releasing a driver, which is forced down due to the pressurized gas in the pressure chamber, and the driver strikes a fastener, thereby driving the fastener into a substrate. Note that this second embodiment tool 110 does not have a magazine positioned on the tool's centerline, as illustrated.

Figure 12:
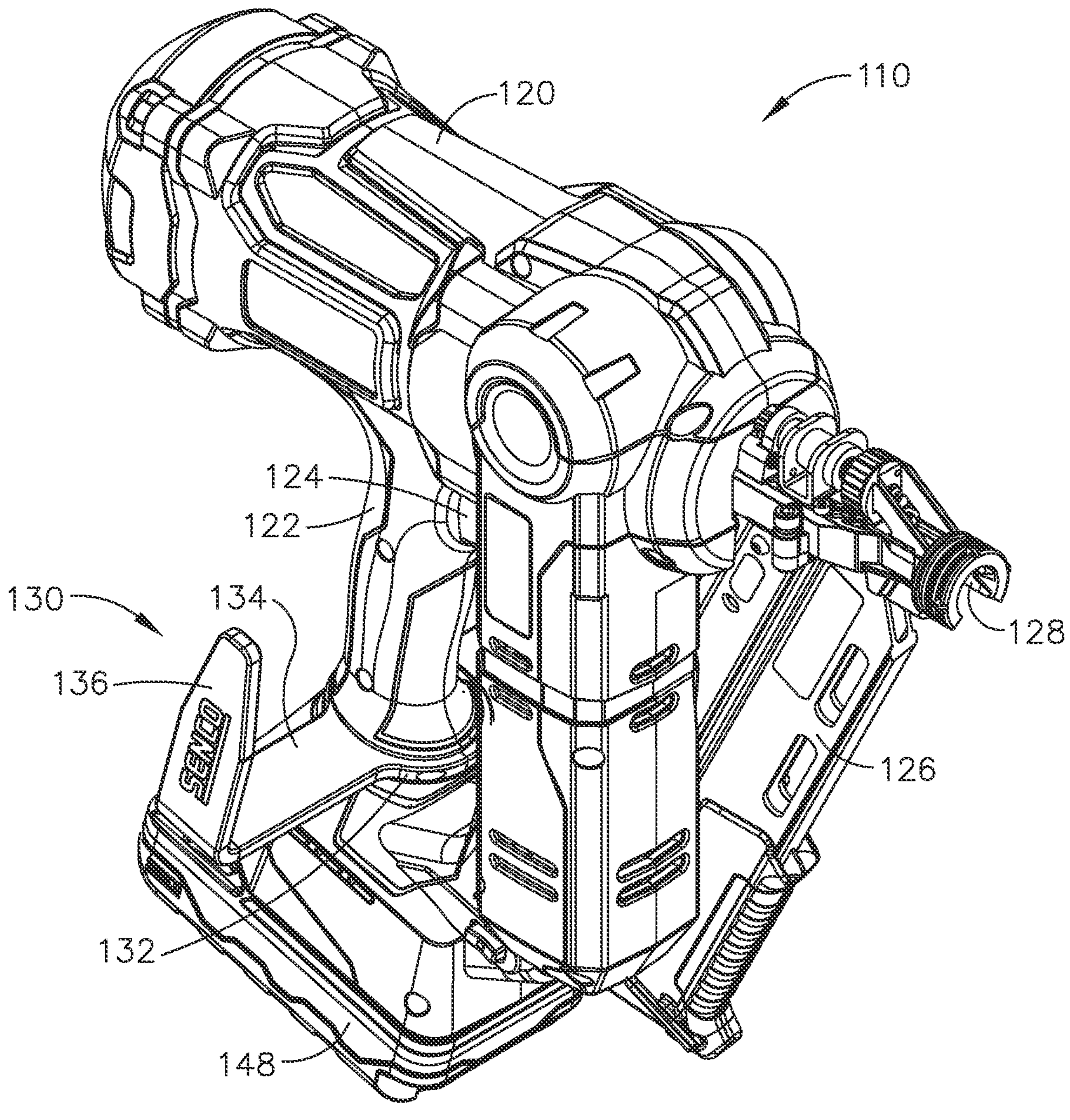
FIG. 12 is a front right perspective view of the first alternate embodiment fastener driving tool of FIG. 11, with the rotatable rafter hanger swiveled to the right side.

Referring now to FIG. 12, the tool 110 is depicted in a view opposite that illustrated in FIG. 10. Note that the hanger S/A 130 is rotated to this opposite side (i.e., the "right" side of the tool).

The rotation of the hanger S/A 130 around the handle 122 of the tool 110 allows the user to securely hang the tool on its right or left side. In an example scenario, a user is operating the tool 110 on the jobsite. The hanger S/A 130 is rotated in the position illustrated in FIG. 11 (to the "left"). However, the user only has a place to hang the tool on his or her right side. Fortunately, for this tool 110, the user can simply rotate the hanger S/A 130 from the "left" position into a "right" position (the position depicted in FIG. 12), and then securely hang the tool on that right side.

The hanger S/A 130 may be securely hung on a 2×4 rafter (see FIGS. 15-18). The space between the tool and the (vertical) hanger portion 136 of the hanger S/A 130 is large enough on both sides of the tool to accommodate a 2×4 standard sized piece of lumber.

Figure 13:
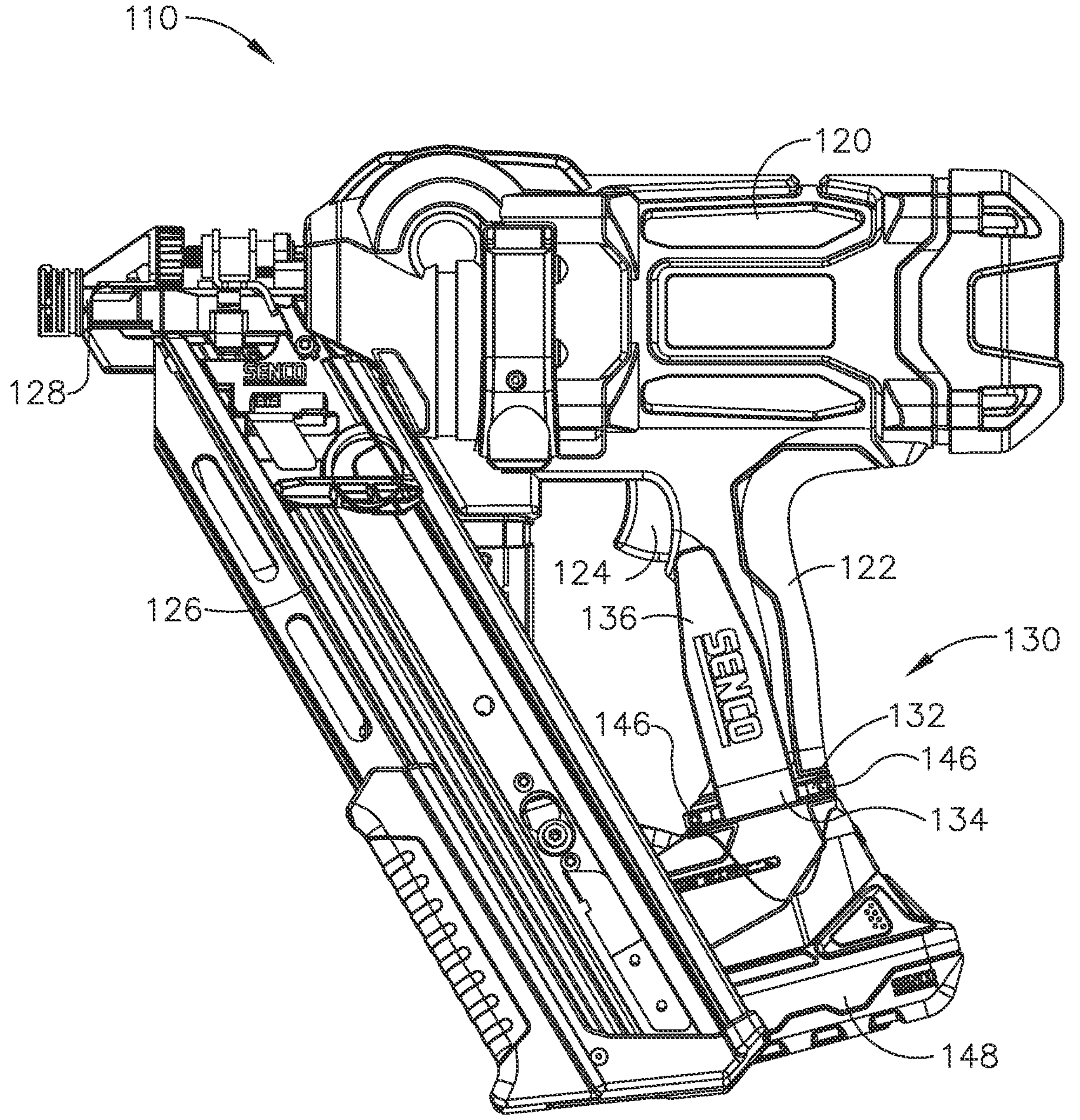
FIG. 13 is a left side view of the first alternate embodiment fastener driving tool of FIG. 11, with the rotatable rafter hanger swiveled to the left side.

Referring now to FIG. 13, the tool 110 is depicted with the hanger S/A 130 on its "left" side. The hanger S/A 130 rotates at the rotatable ring portion 132. The two-piece rotatable ring portion 132 is constrained around the annular groove 140 (see FIG. 19) on the handle, thereby allowing only rotation along a flat plane around the handle 122 of the tool 110. The "tight" constrainment of the hanger S/A 130 around the annular groove 140 on the handle means that when a user hangs the tool, the hanger S/A 130 does not wobble or wiggle enough to fall off the 2×4. Even though the hanger S/A 130 is rotatable, because it is so well constrained, the tool is able to securely hang on a 2×4.

Figure 14:
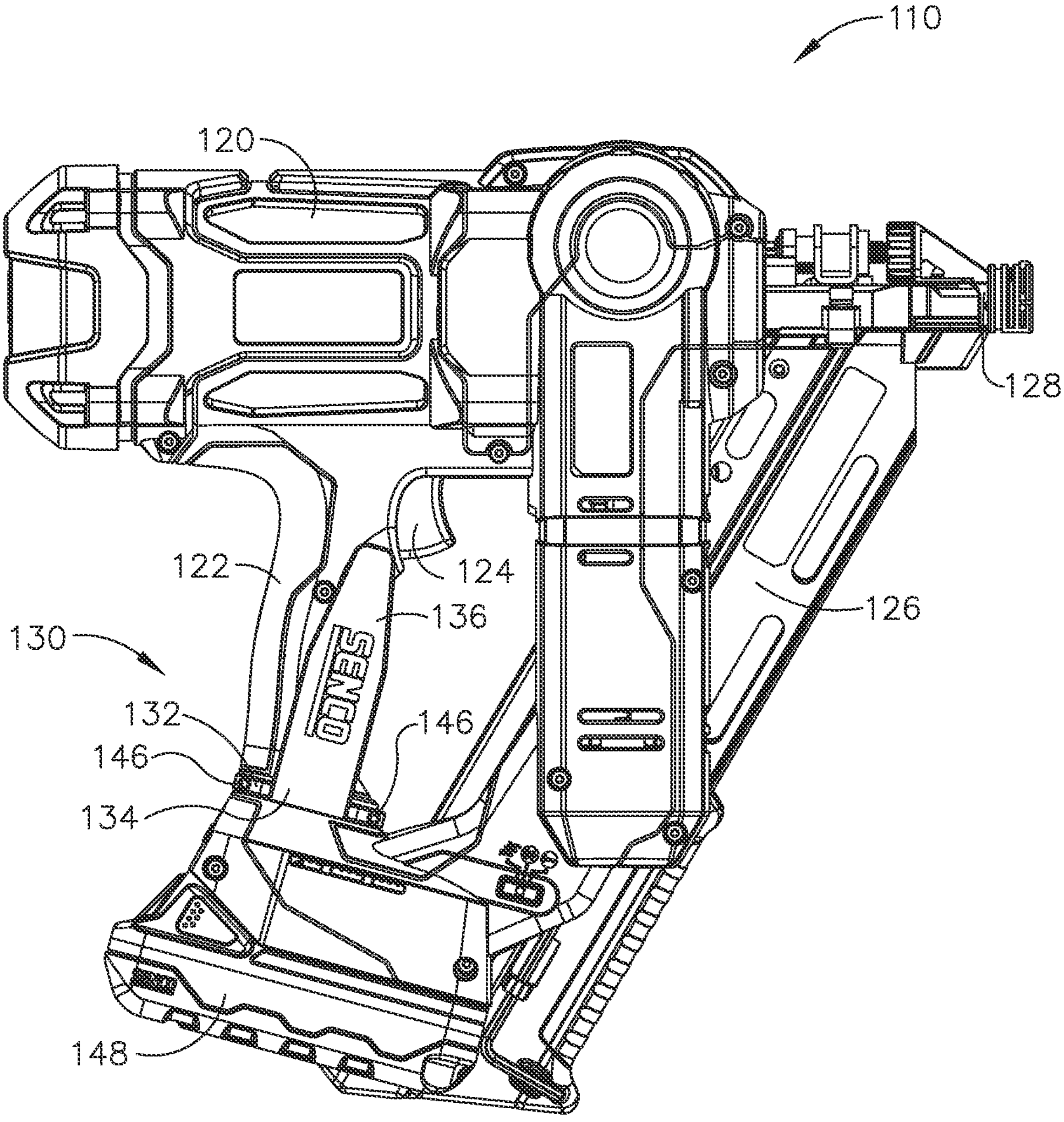
FIG. 14 is a right side view of the first alternate embodiment fastener driving tool of FIG. 11, with the rotatable rafter hanger swiveled to the right side.

Referring now to FIG. 14, the tool 110 is depicted with the hanger S/A 130 on its "right" side. The hanger S/A 130 has been rotated around the handle 122 (in a flat plane, as mentioned above) via the two-piece rotatable ring portion 132.

It is worth mentioning that the optimal location for the hanger S/A 130 is on either side of the tool 110. However, the hanger S/A 130 is rotatable from one side of the magazine 126 to the opposite side of the magazine, so there are a multitude of locations the hanger may be moved to. That being said, the optimal locations are the specifically designed rotatable positions where the tool 110 may be hung on a 2×4 rafter securely. In other rotatable positions, the hanger S/A 130 may be impeded by part of the tool itself, such as the housing 120.

Figure 15:
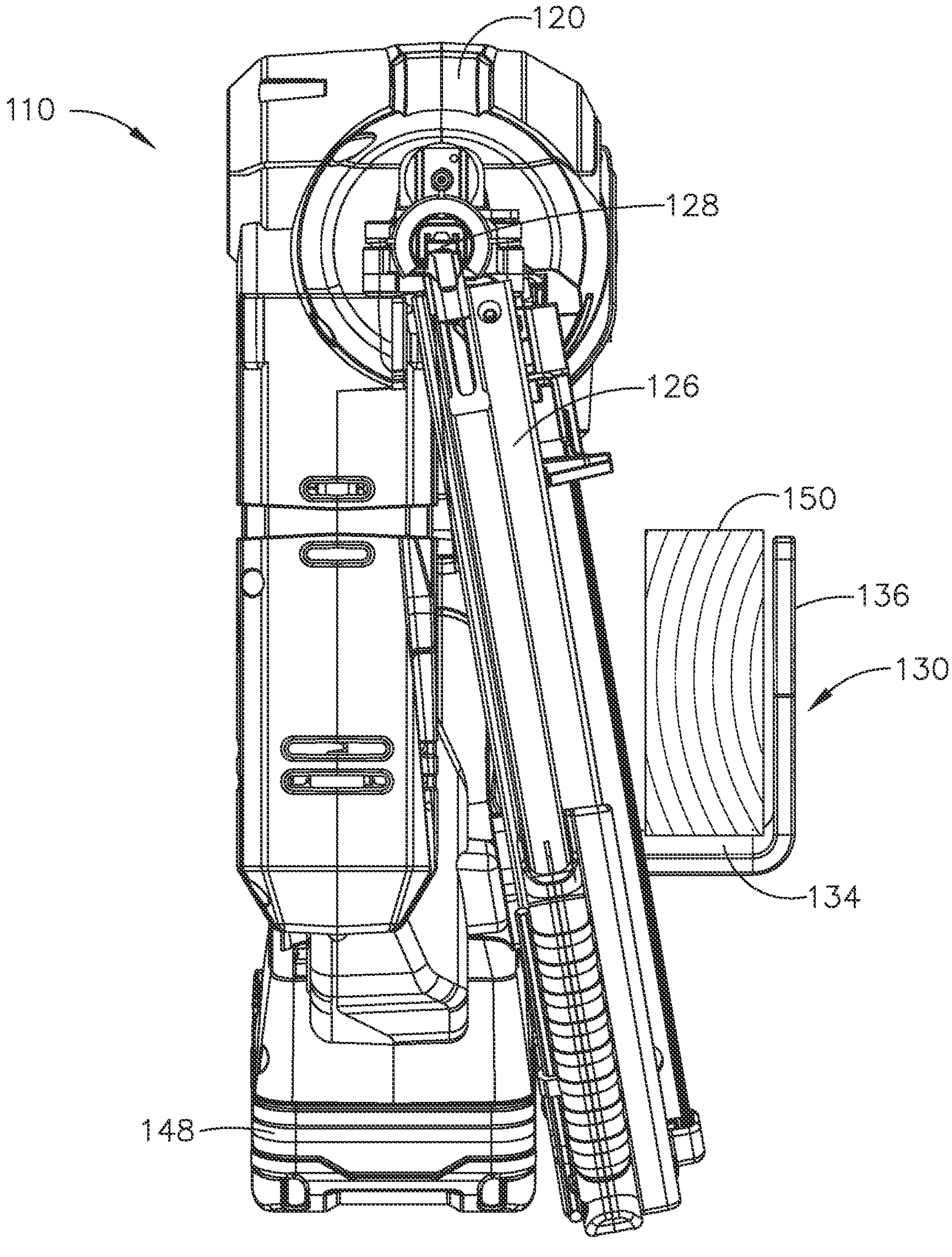
FIG. 15 is a front view of the first alternate embodiment fastener driving tool of FIG. 11, with the rotatable rafter hanger swiveled to the left side, and having a 2×4 rafter seated in the hanger.
Figure 16:
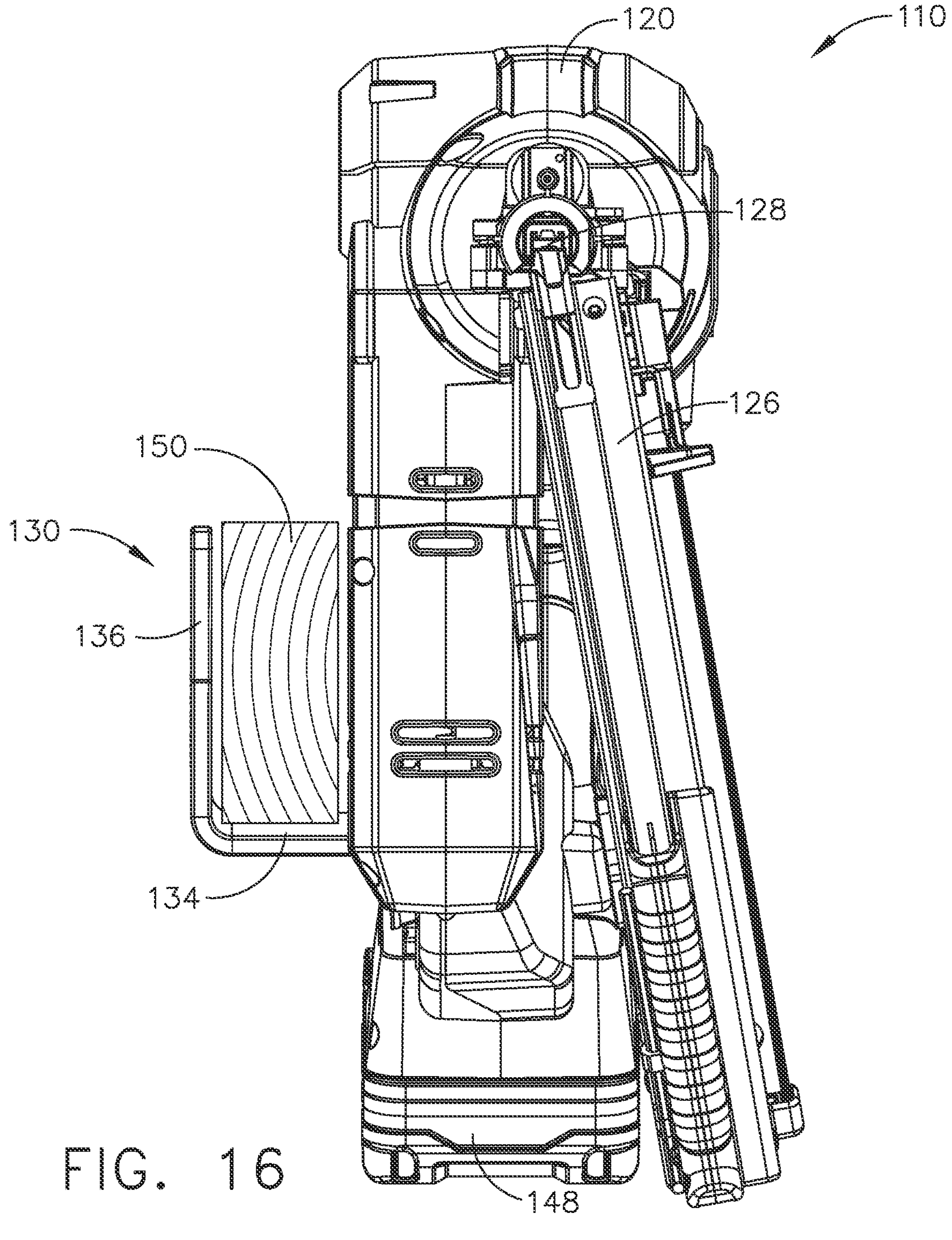
FIG. 16 is a front view of the first alternate embodiment fastener driving tool of FIG. 11, with the rotatable rafter hanger swiveled to the right side, and having a 2×4 rafter seated in the hanger.

Referring now to FIG. 15, a bottom view of the tool 110 is depicted with a 2×4 work piece 150 nested within the hanger S/A 130. The 2×4 piece 150 is preferably a 2×4 wood rafter, but can be any material having a 2×4 dimension characteristic. FIG. 16 depicts the 2×4 workpiece 150 nested in the hanger S/A 130 on the opposite side of the tool 110. It should be noted here that the wood workpiece 150 is illustrated as being cut off right at the hanger 130, which is why part of the word workpiece is depicted in hidden lines (especially on FIG. 16). However, the entire 2×4 workpiece will truly fit along the side of the tool, as well as within the open area right at the hanger, assuming the centerline of the tool is not exactly parallel to the centerline of the workpiece 150 (e.g., the wood rafter or joist that the tool is hanging from).

It can be seen in FIGS. 15 and 16 that the hanger 130 creates an open space between its extending portions 134, 136 and the tool's main housing 120, and between its extending portions 134, 136 and the tool's handle 122 or its magazine 126. This open space is sufficiently large to emplace a standard 2×4 piece of lumber therewithin, which allows the tool to be "hung" (upside down) on such a piece of lumber. Furthermore, it can be seen that the first extending portion 34 entirely confines the lumber, whereas the second extending portion 36 may entirely confine the lumber, but only needs to at least partially confine the lumber. In other words, open space is entirely bounded by the hanger in the first direction (horizontal, in these views) and is at least partially bounded by the hanger in the second direction (vertical, in these views). It will be understood that the length dimension of the hanger's second extending portion 136 does not necessarily need to be completely as long as the 3.5 inch dimension of the 2×4 lumber piece so as to sufficiently confine it against the tool (i.e., to hold the tool in place, once the tool is hung on the lumber piece).

Figure 17:
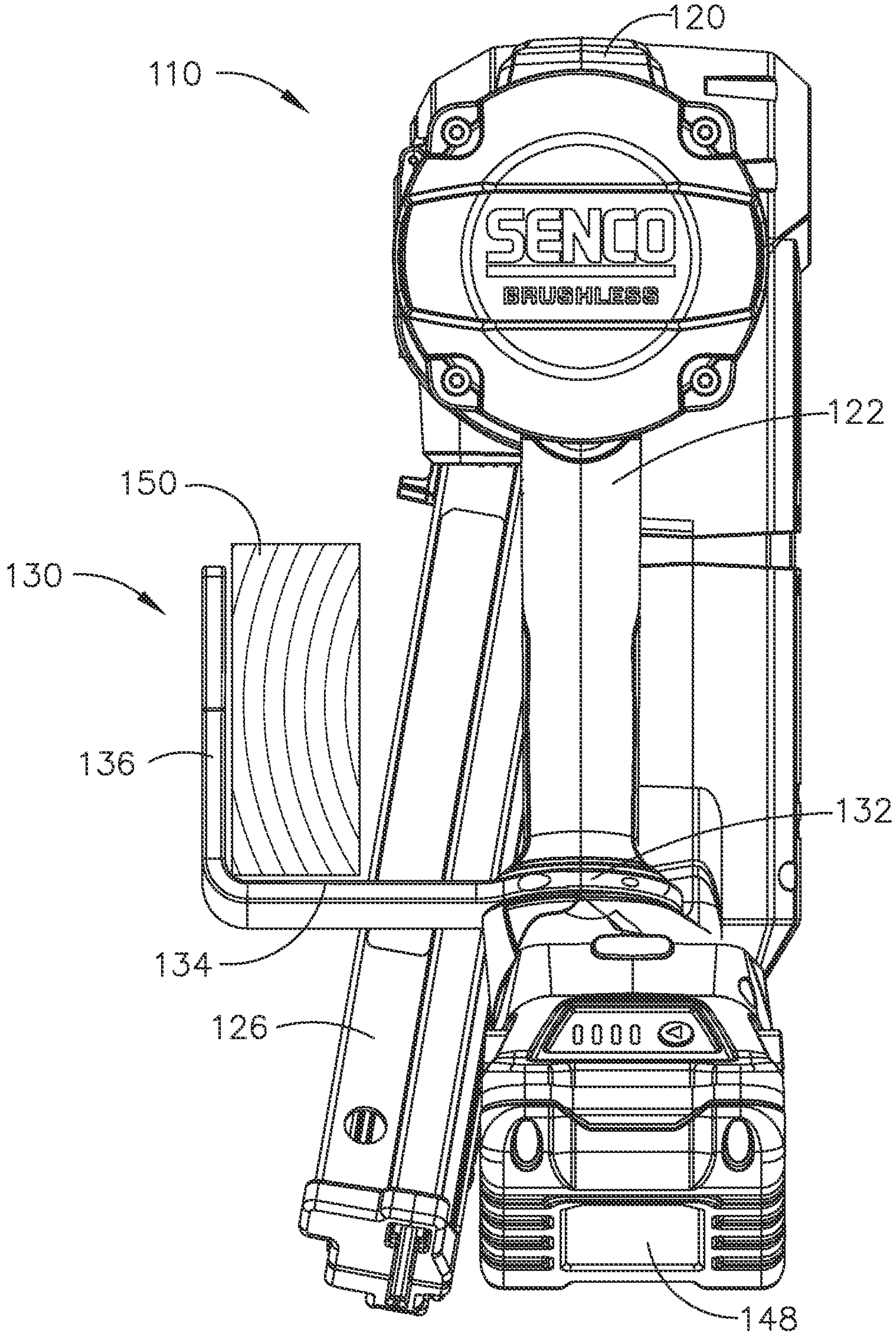
FIG. 17 is a rear view of the first alternate embodiment fastener driving tool of FIG. 11, with the rotatable rafter hanger swiveled to the left side, and having a 2×4 rafter seated in the hanger.
Figure 18:
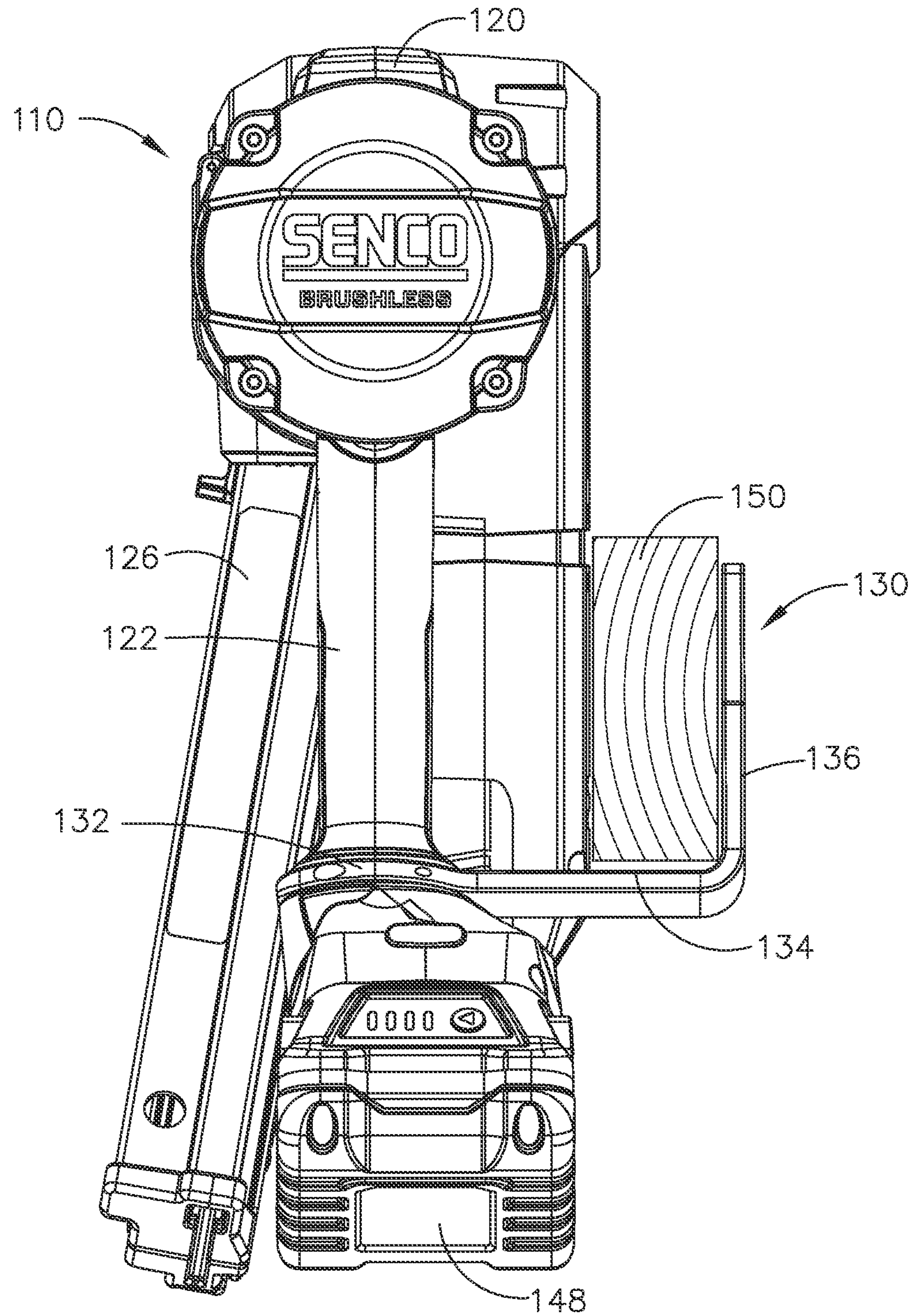
FIG. 18 is a rear view of the first alternate embodiment fastener driving tool of FIG. 11, with the rotatable rafter hanger swiveled to the right side, and having a 2×4 rafter seated in the hanger.

Referring now to FIG. 17, a top view of the tool 110 is depicted with the 2×4 work piece 150 nested in the hanger S/A 130. FIG. 18 depicts the 2×4 work piece 150 nested in the hanger S/A 130 on the opposite side of the tool 110.

Figure 30:
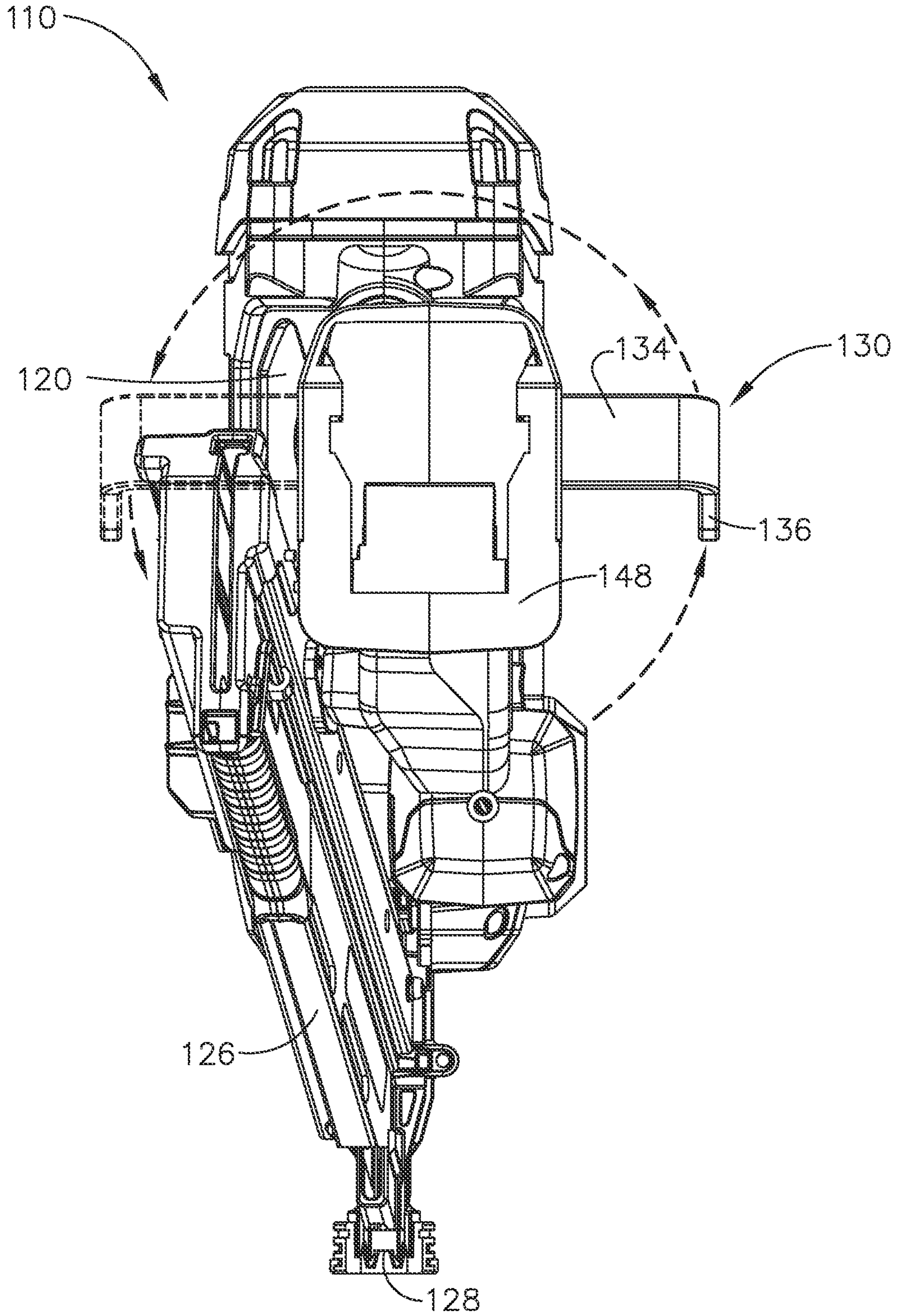
FIG. 30 is a rear view of the rotatable rafter hanger of the first alternate embodiment fastener driving tool of FIG. 11, illustrating the rotatable arc of the hanger's travel around the handle.

As can be seen on FIGS. 17-18, the magazine 126 is not at the centerline of the tool 110; thus, the magazine 26 is asymmetric with the tool 10. Regardless of this asymmetrical attribute, the illustrated embodiment is designed to provide the hanger 130 with a large arc of rotation about the tool 110. Note that the hanger 130 can rotate further on the side opposite the magazine 126, as illustrated in FIGS. 20 and 30.

Figure 19:
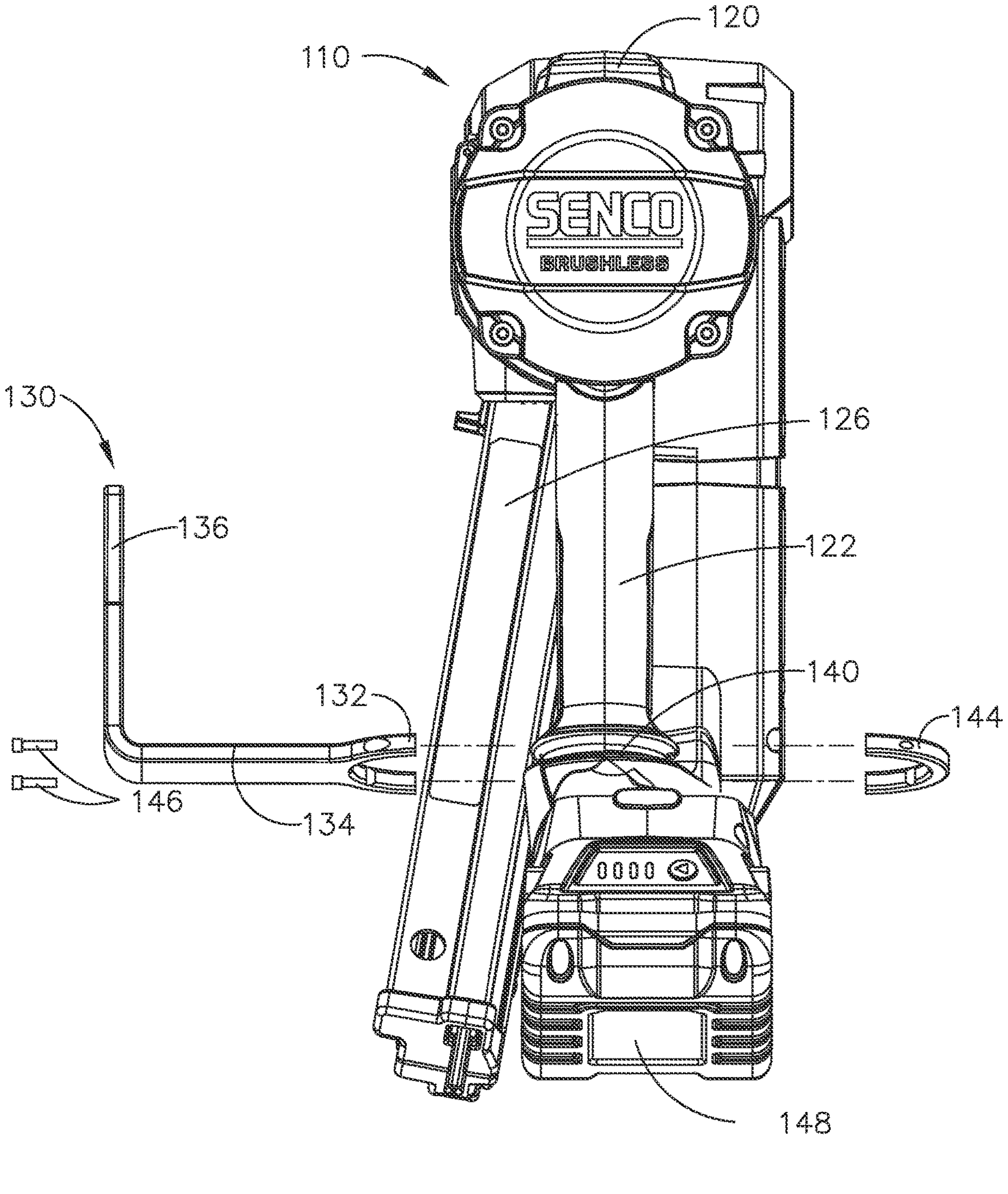
FIG. 19 is a partially exploded view of the rotatable rafter hanger subassembly of the first alternate embodiment fastener driving tool of FIG. 11.

Referring now to FIG. 19, the hanger S/A 130 is depicted in a partially exploded view (with the hanger S/A detached). The two-piece rotatable ring portion 132 attaches to a locking ring portion 144 around the annular groove 140 via a plurality of fasteners 146. As can be seen in the drawings, the ring portion 132 can be referred to as "a first partial ring portion having an inner shape of a semi-circle", and the ring portion 144 can be referred to as "a second partial ring portion having an inner shape of a semi-circle". This semi-circle shape is half of a circle, as shown by the first and second partial ring portions (132,144) in FIG. 19. The first partial ring portion 132 includes a pair of first end surfaces and the second partial ring portion 144 includes a pair of second end surfaces. The first and second end surfaces are configured to meet one another. Once the two-piece rotatable ring portion 132 and the locking ring portion 144 are securely fastened to the annular groove 140, the hanger S/A 130 is secured, and may be rotated via the two-piece rotatable ring portion 132.

Figure 20:
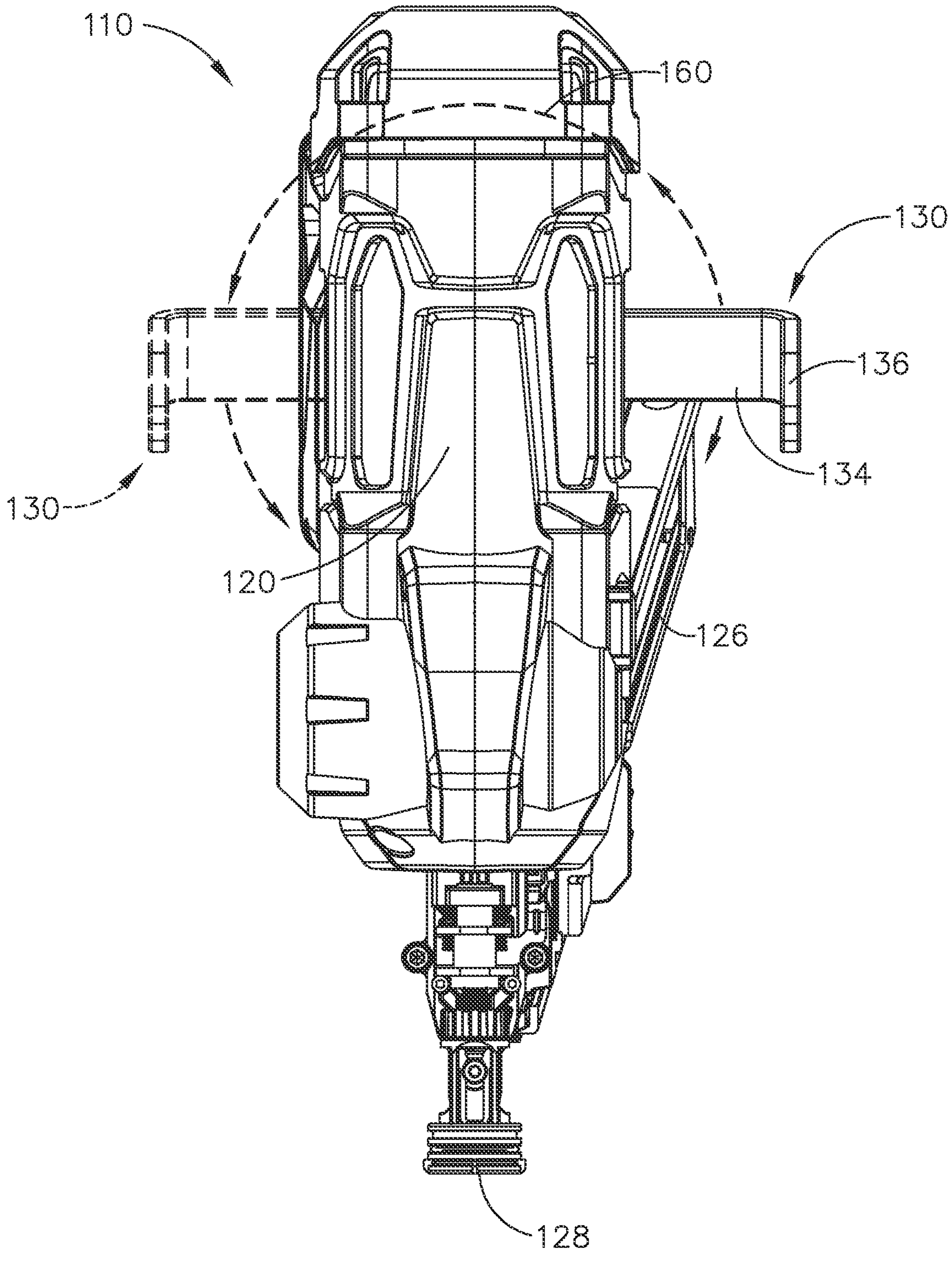
FIG. 20 is a top view of the rotatable rafter hanger of the first alternate embodiment fastener driving tool of FIG. 11, illustrating the rotatable arc of the hanger's travel around the handle.

Referring now to FIG. 20, the tool 110 is depicted showing the hanger S/A's 130 rotational arc 160 around the handle 122. The hanger S/A 130 has sufficient clearance beneath the housing 120 to easily rotate as shown in FIG. 20. Note how far the (vertical) hanger portion 136 is from the housing 120. This space allows the tool 110 to be securely hanged onto a 2×4 rafter when a user is not operating the tool. It should be noted that the two positions illustrated in FIG. 20 are the designed "optimal positions" of the hanger S/A 130. There is enough clearance around the housing 120 and the handle 122 for the hanger S/A 130 to rotate until it touches (or almost touches) the magazine 126 on either side of the tool 110. The hanger S/A 130 may be rotated underneath the rear of the housing 120 as well.

It will be understood that pieces of lumber larger than 2×4s can be held against the rafter hangers described herein. For example, if the hanger is rotated slightly away from a 90 degree angle either to the left or right of both tools 10 and 110, then the hangers can be used to "hang" these tools on other rafter sizes, including at least a 2×12 rafter, or any size between 2×4 and 2×12 rafters. In this manner, these new hanger/tool combinations could be used on rafter heights of virtually any size (even larger than 11.25 inches for a 2×12 rafter). The exact angle of the hanger is essentially self-adjusting as the user goes through the motion of actually hanging the tool/hanger combination on such a large rafter.

Figure 21:
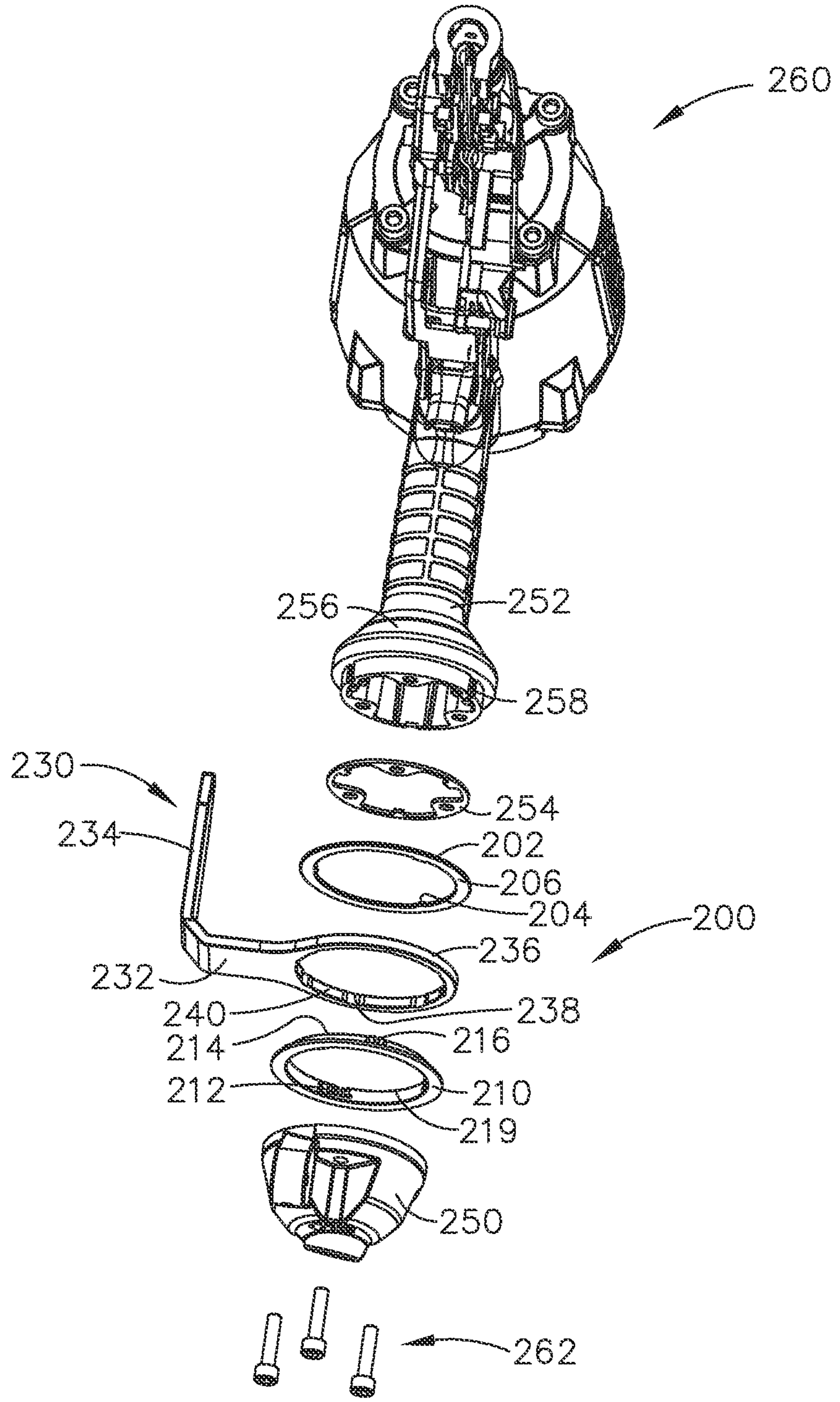
FIG. 21 is a partially exploded view of a second alternate embodiment fastener driving tool with a rotatable hook or hanger subassembly that includes multiple detent positions for positioning the hanger with respect to the tool.

Referring now to FIG. 21, a third embodiment of a fastener driving tool is generally designated by the reference numeral 260. The tool 260 includes a handle 252 which has a cylindrical bearing surface 256 that exhibits a plurality of slot-like indentations (notches) 258 that are designed to act as keyways. A gasket 254 mates against the end of the handle 252 and an end cap 250. This gasket 254 fits inside an annular opening of a hanger subassembly (S/A) 200, and both the gasket 254 and hanger S/A 200 are mounted between the handle 252 and the end cap 250 by fasteners 262.

An annular locking plate (or flat bearing) 202, exhibiting a plurality of inward-facing protrusions 204, securely mates to the handle 252 by matching the inward-facing protrusions 204 with the plurality of keyway-type cutouts (or notches) 258 and then pushing the annular locking plate 202 onto the handle 252. The annular locking plate 202 then becomes unable to rotate around the handle 252, because the inward-facing protrusions 204 (acting as keys) are slotted into the plurality of keyway cutouts 258. The annular locking plate 202 has a bearing surface 206 that an annular rotatable ring portion 236 slides against when a hanger 230 is rotated around the handle 252.

The hanger 230 exhibits a first extending (about horizontal in this view) portion 232, and then bends to further extend along a second extending (about vertical in this view) portion 234, and the annular rotatable ring portion 236. Preferably, this hanger 230 is constructed as a solid unitary piece, such as aluminum, for example. The annular rotatable ring portion 236 exhibits a circumferential (inward-facing) bearing surface 240, and this bearing surface 240 includes a plurality of arcuate-shaped, relatively smooth concave indentations 238 that will act as detent positions, as explained below. The concave indentations 238 are located at predetermined spaced-apart positions around the bearing surface 240.

It should be noted that the overall shape of the hanger 230 can be expressed in a more general way, such as: the ring portion 236 exhibits a first extension portion 232 that extends in a direction that is substantially perpendicular with respect to a longitudinal axis of the tool. There is also a second extension portion 234 that extends from the first extension portion in a direction that is substantially perpendicular with respect to the first extension portion.

An annular main bearing 210 exhibits an inner annular bearing surface 219 having a plurality of inner (inward-facing) protrusions 212 that act as keys, to prevent rotation. The annular main bearing 210 may be constructed out of Delrin®, for example. The inner bearing surface 219 mates with the cylindrical bearing surface 256, and these inner protrusions 212 securely mate to the plurality of slots (notches or keyways) 258, thereby locking the annular main bearing 210 in place so it cannot be rotated (in the same manner that the annular locking plate 202 "locks" into place on the handle 252, discussed above). Thus, the annular locking plate 202 and the annular main bearing 210 lock into place with the cylindrical bearing surface 256 thereby preventing rotation between those surfaces. Of course, since the hanger 230 is secured between the annular locking plate 202 and the annular main bearing 210, but not mated with the cylindrical bearing surface 256, the hanger 230 is free to move about its travel arc.

The annular main bearing 210 exhibits an outer annular bearing surface 218 having a plurality of semi-radial (outward-facing) projections 216, and a mating surface or lip 214. The plurality of semi-radial projections 216 are angled (i.e., they are not strictly 'aimed' along the radius of the bearing 210), and exhibit elastic properties (e.g., they are somewhat flexible), such that the plurality of semi-radial projections compress if the hanger 230 is rotated about the handle 252, and the plurality of semi-radial projections decompress if the hanger 230 is rotated to the plurality of concave detents 238. The annular main bearing 210 is mated to the annular rotatable ring portion 236 by placing the outer bearing surface 218 inside the bearing surface 240. The mating surface 214 provides a "locking" surface by pressing the lip over the bearing surface 240, thereby fitting the annular main bearing 210 in place inside the annular rotatable ring portion 236.

The plurality of semi-radial projections 216 provide a substantially constant outward radial force against the bearing surface 240. This provides some friction when a user rotates the hanger 230 around the handle 252, after assembly, because the plurality of semi-radial projections 216 are compressed against the bearing surface 240. When the hanger 230 is rotated so that the plurality of semi-radial projections 216 slide into the plurality of concave detents 238, a "soft lock" point is reached. The user will feel this "soft lock" and know the hanger 230 has become more secure upon reaching this rotated position, because the plurality of semi-radial projections 216 decompress to better "hold" at the plurality of concave detents 238. At this "soft lock" position, the hanger 230 is in a detent state that will prevent further rotation of the rotatable ring portion, unless additional torque is applied in the rotational direction to the hanger 230 or the annular rotatable ring portion 236.

If the user continues to rotate the hanger 230, the plurality of semi-radial projections 216 will slide out of the plurality of concave detents 238 due to the shape of the plurality of concave detents, and the plurality of semi-radial projections 216 will compress. The plurality of concave detents 238 and plurality of semi-radial projections 216 allow several "soft lock" positions as the hanger 230 is rotated around the handle 252.

Figure 22:
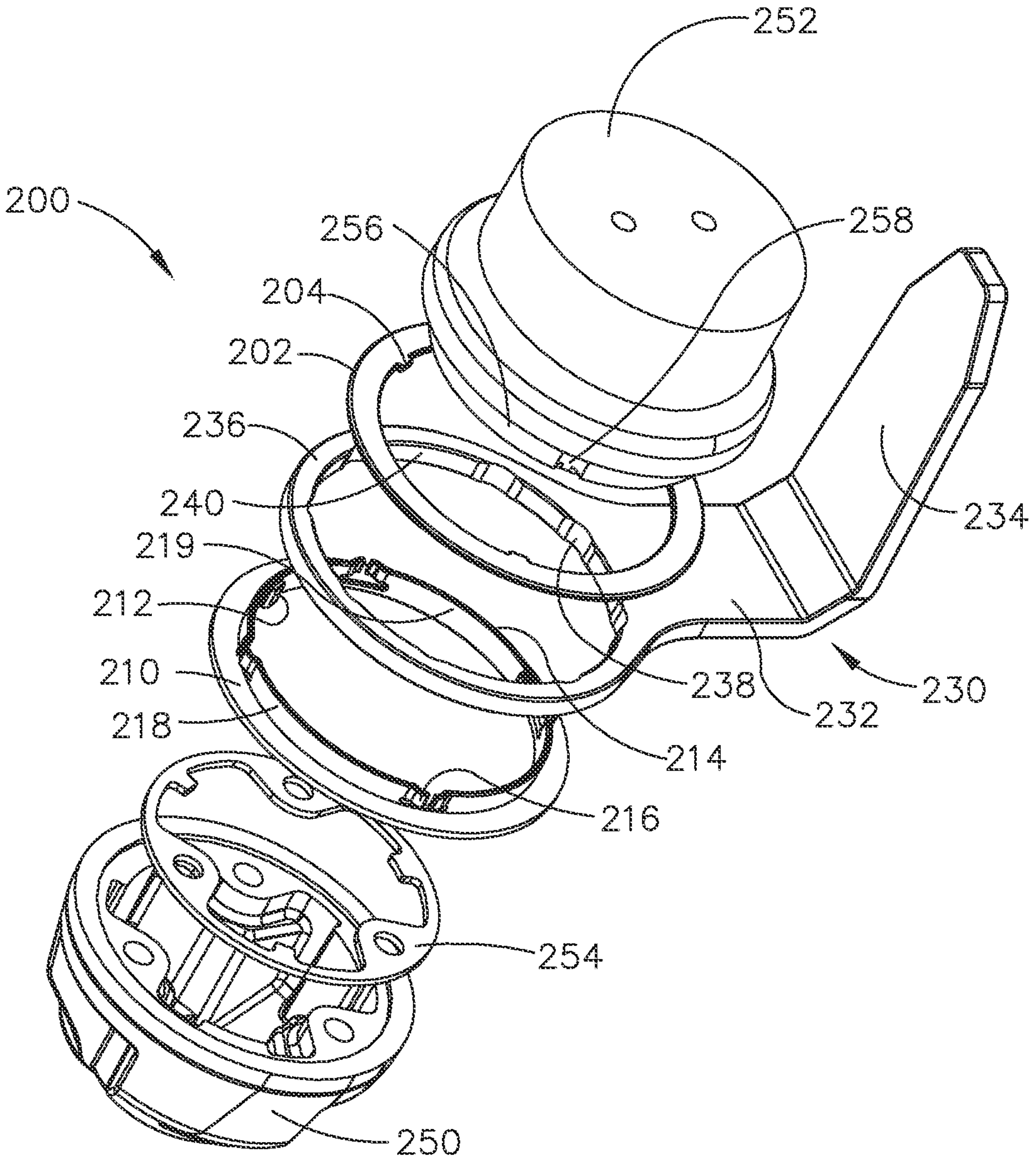
FIG. 22 is an exploded view of the rotatable hanger sub-assembly of the second alternate embodiment fastener driving tool of FIG. 21.

Referring now to FIG. 22, the third embodiment hanger S/A 200 is illustrated in an exploded view. Each portion of the hanger S/A 200 is preferably assembled in a specific order, although the gasket 254 can be positioned just prior to fastening the handle 252 and the end cap 250, since it sits in the middle of the other portions. To assemble, first the annular plate 202 is placed onto the handle 252 so that the plurality of inward facing protrusions 204 slide into the plurality of keyways 258. As mentioned above, the plate 202 does not move (rotate) once mounted to the handle 252.

Next, the annular main bearing 210 is placed into the annular rotatable ring portion 236 of the hanger 230. The annular main bearing 210 should lock into place via the lip 214 "snapping" into place over the bearing surface 240.

Then, the combined annular main bearing 210 and hanger 230 are positioned over the handle 252, the plurality of inner protrusions 212 are lined up over the plurality of keyways 258, and then pushed into place on the handle. The annular main bearing 210 should not move once mounted, but the hanger 230 is rotatable around the handle 252. As mentioned above, the plurality of semi-radial projections 216 on the annular main bearing 210 provide a constant outward radial force against the bearing surface 240 of the annular rotatable ring portion 236. This provides friction when the user rotates the hanger 230, and also provides several "soft lock" positions when the plurality of semi-radial projections 216 slide into the plurality of concave detents 238.

Last, the end cap 250 is positioned over the handle 252, and the fasteners 262 (see FIG. 21) are fastened through the end cap 250 so that the entire hanger S/A 200 is securely attached to the tool 260.

Figure 23:
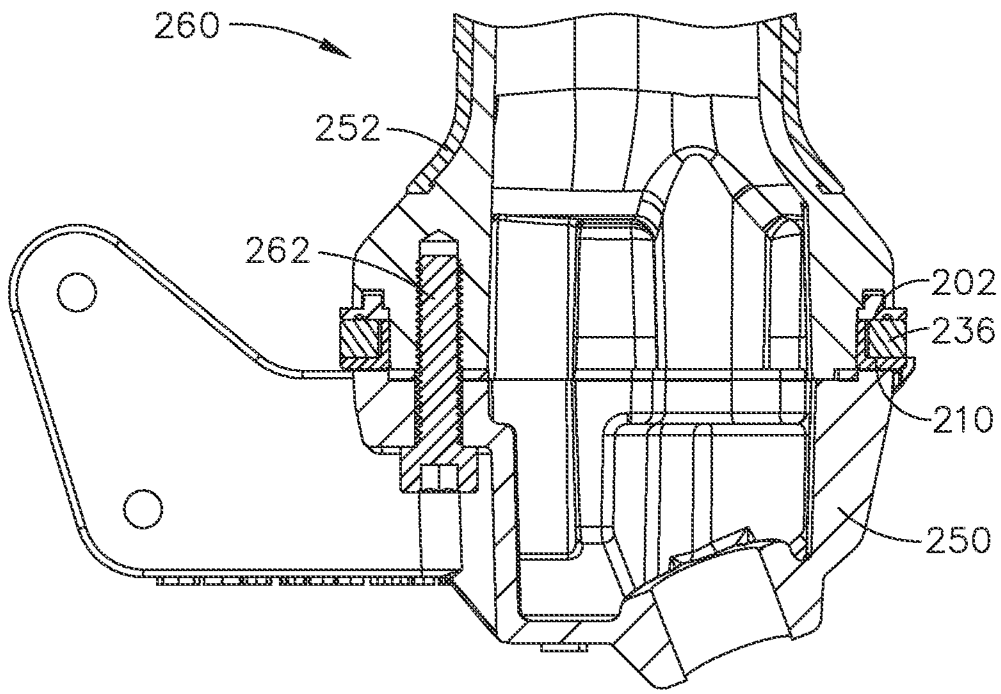
FIG. 23 is a side cutaway view of the second alternate embodiment fastener driving tool of FIG. 21.

Referring now to FIG. 23, the assembled hanger S/A 200 is illustrated in a cutaway view. The annular plate 202 is proximal to the handle 252. The annular main bearing 210 and the annular rotatable ring portion 236 are proximal to the annular plate 202. By "locking" the plurality of inward facing protrusions 204 and the plurality of inner protrusions 212 to the handle 252, the annular rotatable ring portion 236 is securely rotatable around the handle. The end cap 250 is fastened securely to the handle 252.

Figure 24:
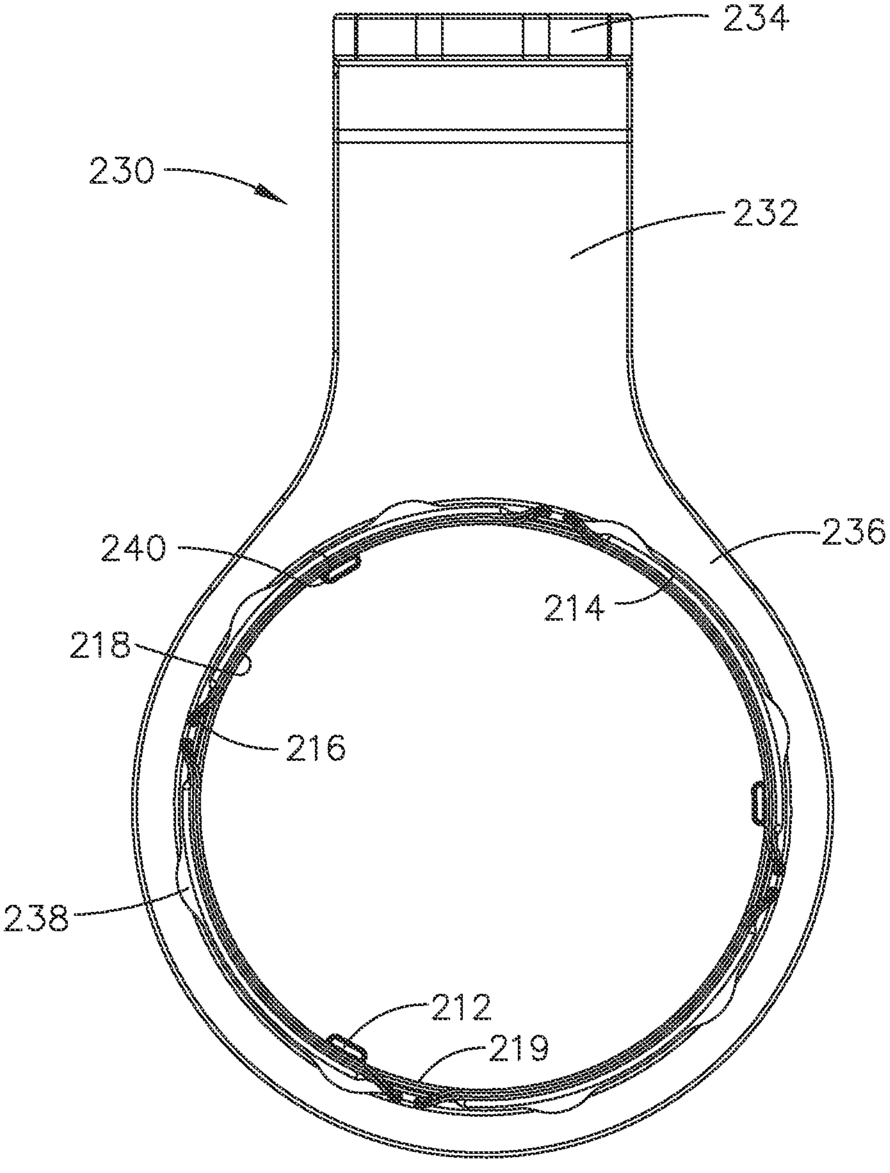
FIG. 24 is a bottom view of the second alternate embodiment fastener driving tool of FIG. 21, illustrating an annular main bearing mated with a handle portion of the rotatable hanger.

Referring now to FIG. 24, the hanger 230 and annular main bearing 210 are illustrated from a top view. Note that the plurality of semi-radial projections 216 are not positioned at the plurality of concave detents 238. In other words, FIG. 24 does not illustrate a "soft lock" state. In a "soft lock" state, the plurality of semi-radial projections 216 would be positioned at the plurality of concave detents 238 (see FIG. 28).

Note also that the lip or mating surface 214 is mated to the annular rotatable ring portion 236. The plurality of inner protrusions 212 are illustrated, and these mate with the plurality of keyways 258 on the handle 252 (see FIG. 23).

Figure 25:
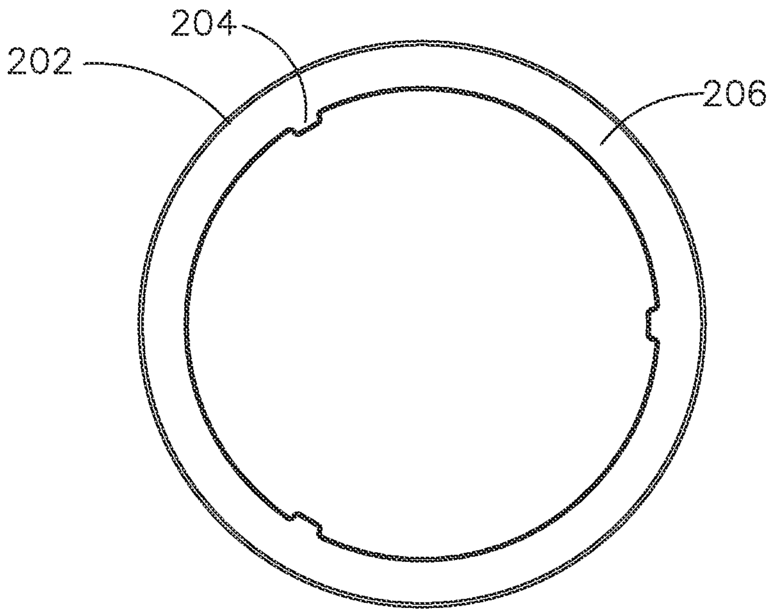
FIG. 25 is a bottom view of the second alternate embodiment fastener driving tool of FIG. 21, illustrating a slidable plate of the rotatable hanger.

Referring now to FIG. 25, the annular plate 202 is illustrated in a top view. Note the plurality of inward facing protrusions 204; these mate with the plurality of notches 258 on the handle 252 to "lock" the annular plate 202 in place (see FIG. 23). The bearing surface 206 is proximal to the annular rotatable ring portion 236, and this bearing surface 206 is what the annular rotatable ring portion slides against when the hanger 230 is rotated around the handle 252 (see FIG. 23).

Figure 26:
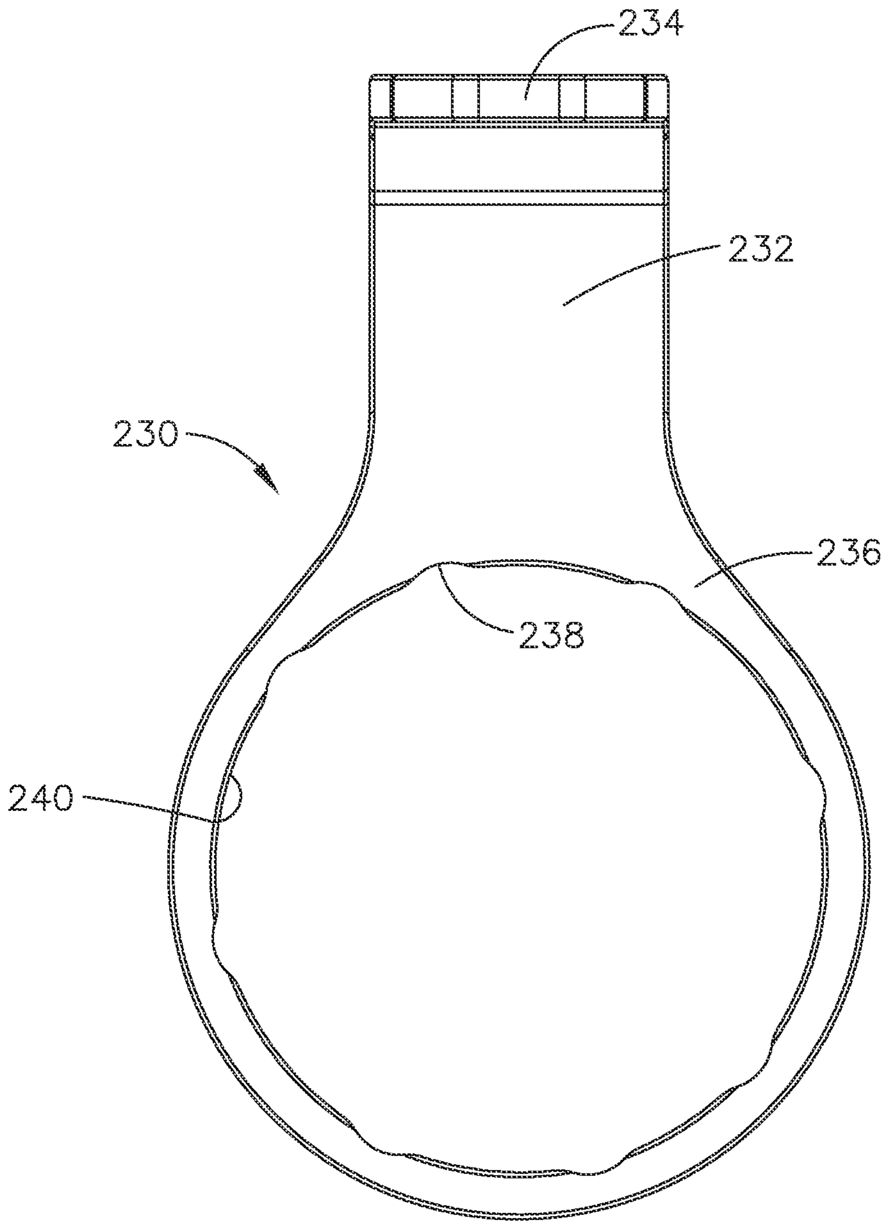
FIG. 26 is a bottom view of the second alternate embodiment fastener driving tool of FIG. 21, illustrating the handle portion of the rotatable hanger (which mounts in the tool's handle).

Referring now to FIG. 26, the hanger 230 is illustrated in a top view. The (inward-facing) bearing surface 240 is shown, including the plurality of concave indentations 238. This bearing surface 240 slides against the outer bearing surface 218 of the annular main bearing 210 when the hanger 230 is rotated around the handle 252. The bearing surface 240 also slides against the plurality of semi-radial projections 216, and this bearing surface 240 is subject to the constant outward radial force produced by the plurality of semi-radial projections.

Figure 27:
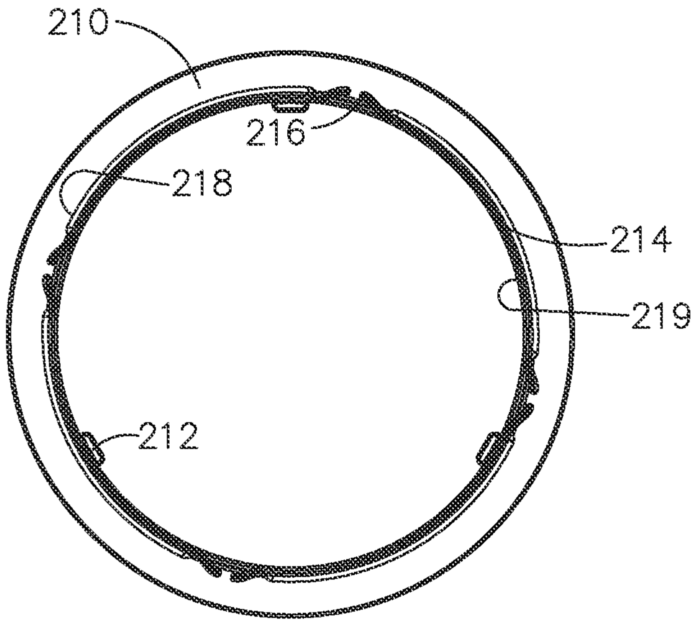
FIG. 27 is a bottom view of the second alternate embodiment fastener driving tool of FIG. 21, illustrating the main bearing of the rotatable hanger.

Referring now to FIG. 27, the annular main bearing 210 is illustrated in a top view. The outer bearing surface 218 is illustrated, including the plurality of semi-radial projections 216. The inner bearing surface 219 and the plurality of inner protrusions 212 mate with the cylindrical bearing surface 256 and the plurality of keyways 258, respectively, on the handle 252. The annular rotatable ring portion 236 slides against the annular main bearing 210 when the hanger 230 is rotated around the handle 252.

The semi-radial projections 216 extend from the circumferential outer bearing surface 218 in pairs, in the illustrated embodiment. Each of these pairs of projections 216 have a small air gap therebetween. When the hanger is rotated, the projections 218 will not "catch" on the concave opposite detent indentations 238, because those concave surfaces are quite smooth. It will be understood that any appropriate shape could be used for these projections 216 and for the concave indentations 238, acting as detent surfaces, without departing from the principles of the present technology disclosed herein.

Figure 28:
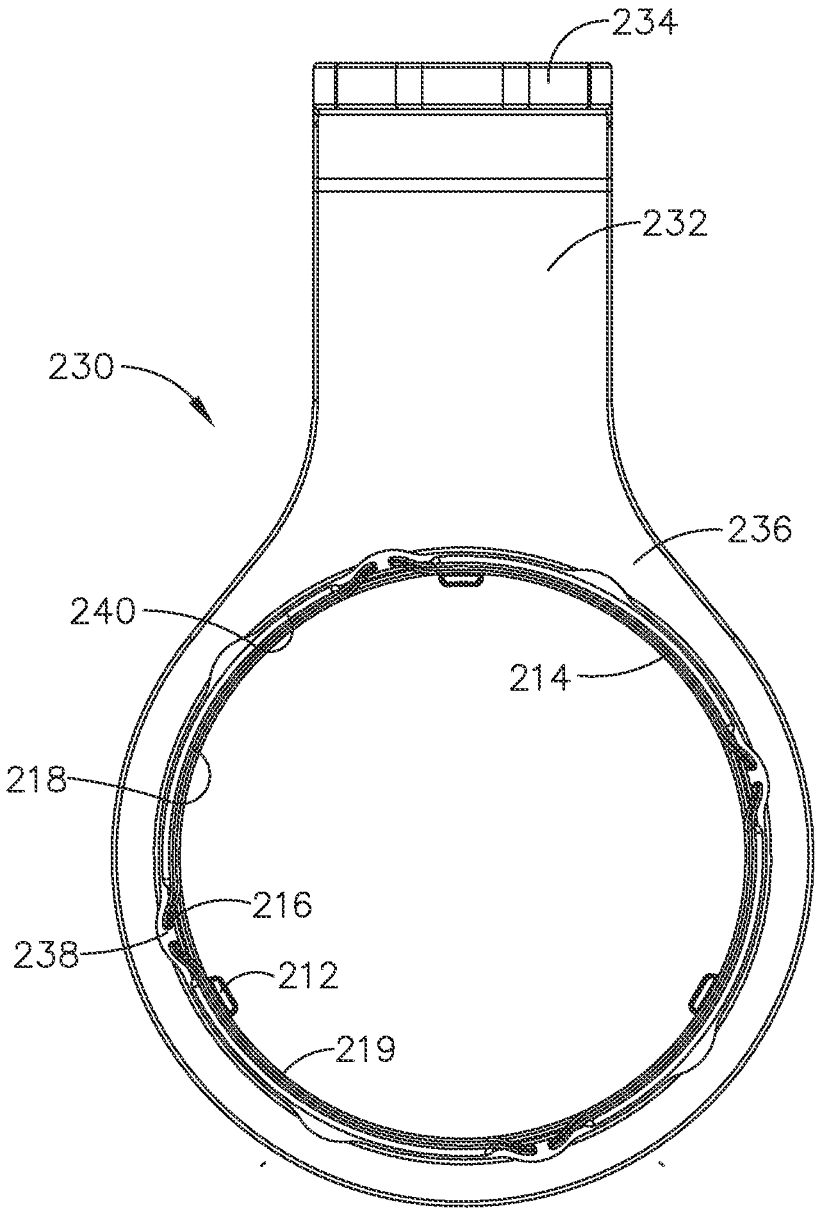
FIG. 28 is a bottom view of the second alternate embodiment fastener driving tool of FIG. 21, illustrating the main bearing in a "soft lock" position with the handle portion of the rotatable hanger.

Referring now to FIG. 28, the annular main bearing 210 is illustrated in a "soft lock" position with the hanger 230. In this view, the plurality of semi-radial projections 216 are positioned at the plurality of concave detents 238, and the constant outward radial force projected by the plurality of semi-radial projections secures this "soft lock" position. Of course, if the user provides sufficient twisting torque while rotating the hanger 230, then the plurality of semi-radial projections 216 will slide out of the plurality of concave detents 238, and this position is illustrated in FIG. 24.

The principles discussed above and illustrated in the drawings can be further summarized in a series of short statements, such as follows:

{A1} A fastener driving tool, comprising: an outer housing portion; a handle portion; a magazine that stores fasteners; a fastener exit portion; and a movable hanger that is rotatable around the handle portion; wherein: (a) the hanger exhibits a minimum rotational travel from at least a first position at a first side of the tool to at least a second position at a second, opposite side of the tool; (b) the hanger, if rotated to the first position, is sized and shaped to provide an open space between the hanger and the outer housing portion at the first side of the tool, and between the hanger and the handle portion at the first side of the tool, the open space having a minimum dimension of at least 1.5 inches in a first direction and of at least 3.5 inches in a second, perpendicular direction; and (c) the hanger, if rotated to the second position, is sized and shaped to provide an open space between the hanger and the outer housing portion at the second side of the tool, and between the hanger and the handle portion at the second side of the tool, the open space having a minimum dimension of at least 1.5 inches in the first direction and of at least 3.5 inches in the second, perpendicular direction.

{A2} The fastener driving tool of the above paragraph {A1} plus the following features: the open space is entirely bounded by the hanger in the first direction and is at least partially bounded by the hanger in the second direction.

{A3} The fastener driving tool of the above paragraph {A1} plus the following features: (a) the open space allows a standard sized 2×4 piece of lumber to be emplaced therein, whether the hanger is positioned at the first position, or at the second position, and (b) the 2×4 piece of lumber has outer width and height dimensions of about 1.5 inches by 3.5 inches, and of a varying outer length dimension.

{A4} The fastener driving tool of the above paragraph {A1} plus the following features: the minimum travel of hanger rotation is from at least a full left-hand position at a left side of the tool to at least a full right-hand position at a right side of the tool.

{A5} The fastener driving tool of the above paragraph {A1} plus the following features: the rotatable hanger is of a single-piece, unitary construction, comprising: (a) a ring portion that fits around the handle portion; and (b) an extension portion that extends from the ring portion along the first direction, then bends to further extend along the second direction.

{A6} The fastener driving tool of the above paragraph {A1} plus the following features: wherein: the rotatable hanger is of a two-piece construction, comprising: (a) a first partial ring portion; (b) an extension portion that extends from the first partial ring portion along the first direction, then bends to further extend along the second direction; (c) a second partial ring portion; and (d) at least one fastener for holding the first and second partial ring portions together, so as to fit around the handle portion.

{A7} The fastener driving tool of the above paragraph {A5} plus the following features: an end cap located at the base of the handle; the end cap includes an upper portion and a lower portion mated together by a plurality of fasteners; and the single-piece hanger is rotatably mounted between the end cap upper and lower portions.

{A8} The fastener driving tool of the above paragraph {A6} plus the following features: the handle exhibits an annular groove about its outer perimeter; and the two-piece hanger is rotatably mounted in the annular groove.

{B1} A fastener driving tool, comprising: an outer housing portion; a handle portion; a magazine that stores fasteners; a fastener exit portion; and a movable hanger that is rotatable about the handle portion; wherein: (a) the hanger exhibits a minimum rotational travel from at least a first position at a first side of the tool to at least a second position at a second, opposite side of the tool; (b) the hanger, if rotated to the first position, is configured to fit around at least a 1.5 inch-wide solid surface, if placed between an outer portion of the hanger and the outer housing portion, and between the outer portion of the hanger and the handle portion; and (c) the hanger, if rotated to the second position, is configured to fit around at least a 1.5 inch-wide solid surface, if placed between an outer portion of the hanger and the outer housing portion, and between the outer portion of the hanger and the handle portion.

{B2} The fastener driving tool of the above paragraph {B1} plus the following features: the minimum travel of hanger rotation is from at least a full left-hand position at a left side of the tool to at least a full right-hand position at a right side of the tool.

{B3} The fastener driving tool of the above paragraph {B2} plus the following features: the magazine and the fastener exit portion are both located substantially along a centerline of the tool; and the full left-hand position and the full right-hand position of the hanger are substantially symmetrical with respect to the outer housing portion and with respect to the fastener exit portion.

{B4} The fastener driving tool of the above paragraph {B2} plus the following features: the fastener exit portion is located substantially along a centerline of the tool; the magazine is offset to the first side, and is not located substantially along a centerline of the tool; the outer housing portion is, at least in part, offset to the second side at a region proximal to the handle portion; the full left-hand position and the full right-hand position of the hanger each are positioned in a spaced-apart relationship with one of the magazine and the region of the outer housing portion that is proximal to the handle portion, and the spaced-apart relationship on both the left side and the right side of the tool is sufficiently large to fit around the at least a 1.5 inch-wide solid surface.

{C1} A method for hanging a fastener driving tool on a solid rectangular-shaped surface, the method comprising: (a) providing a fastener driving tool, including: (i) an outer housing portion; (ii) a handle portion; (iii) a magazine that stores fasteners; (iv) a fastener exit portion; and (v) a movable hanger that is rotatable about the handle portion, the hanger including an extension portion that is configured to fit around at least a 1.5 inch surface of a solid rectangular-shaped object that exhibits two dimensions that are about 1.5 inches in width by about 3.5 inches in height; (b) rotating the hanger around the handle portion to a first rotational position at a first side of the tool, and hanging the tool on the solid rectangular-shaped object, using the extension portion of the hanger; and (c) later, rotating the hanger around the handle portion to a second rotational position at a second, opposite side of the tool, and hanging the tool on the solid rectangular-shaped object, using the extension portion of the hanger.

{C2} The method of the above paragraph {C1} plus the following features: the rotatable hanger comprises: (a) a ring portion that fits around the handle portion; and (b) an extension portion that extends from the ring portion along a first direction, then bends to further extend along a second direction that is substantially perpendicular to the first direction.

{C3} The method of the above paragraph {C1} plus the following features: the rotatable hanger comprises: (a) a first partial ring portion; (b) an extension portion that extends from the first partial ring portion along the first direction, then bends to further extend along the second direction; (c) a second partial ring portion; and (d) at least one fastener for holding the first and second partial ring portions together, so as to fit around the handle portion.

{C4} The method of the above paragraph {C2} plus the following features: an end cap located at the base of the handle; the end cap includes an upper portion and a lower portion mated together by a plurality of fasteners; and the hanger is rotatably mounted between the end cap upper and lower portions.

{C5} The method of the above paragraph {C3} plus the following features: the handle exhibits an annular groove about its outer perimeter; and the hanger is rotatably mounted in the annular groove.

{D1} A handle with a rotatable hanger for use in a fastener driving tool, comprising: (a) a rotatable hanger comprising: (i) a first portion including: (A) a rotatable ring portion, the ring portion including an inward-facing first bearing surface, the first bearing surface exhibiting a plurality of concave indentations located at predetermined spaced-apart positions around the first bearing surface; and (B) an extension portion that extends from the ring portion along a first direction, then bends to further extend along a second, substantially perpendicular direction; (ii) a second portion including: (A) an annular bearing that includes an outward-facing second bearing surface and an inward-facing third surface, the second bearing surface exhibiting a plurality of outward-facing projections, the second bearing surface facing toward the first bearing surface; (B) the plurality of outward-facing projections are located at predetermined spaced-apart positions around the second bearing surface; and (C) the third surface exhibiting at least one inward-facing protrusion located on the third surface; (b) a handle portion including a fourth surface, the fourth surface exhibiting at least one notch, the fourth surface facing toward the third surface; (c) wherein: (i) the second bearing surface mates to the first bearing surface; (ii) if the plurality of outward-facing projections are in contact with the first bearing surface at locations not at one of the plurality of concave indentations, then the first portion is allowed to rotate about the handle portion at the first and second bearing surfaces; and (iii) if the plurality of outward-facing projections are in contact with the first bearing surface at the plurality of concave indentations, then rotation between the third surface and the fourth surface is prevented.

{D2} The handle with a rotatable hanger of the above paragraph {D1} plus the following features: if the rotatable ring portion is positioned such that the plurality of outward-facing projections are positioned at the plurality of concave indentations, then the rotatable hanger is in a detent state that will prevent further rotation of the rotatable ring portion.

{D3} The handle with a rotatable hanger of the above paragraph {D2} plus the following features: the detent state will persist until additional torque is applied in the rotational direction to at least one of the rotatable ring portion and the handle portion.

{D4} The handle with a rotatable hanger of the above paragraph {D1} plus the following features: the plurality of outward-facing projections are compressed when in contact with the first bearing surface at locations not at one of the plurality of concave indentations, and the plurality of outward-facing projections are, at least to some extent, decompressed when in contact with the first bearing surface at the plurality of concave indentations.

{D5} The handle with a rotatable hanger of the above paragraph {D1} plus the following features: the plurality of outward-facing projections are angled, and exhibit elastic properties; the plurality of outward-facing projections compress if the first portion is rotated around the handle portion; the plurality of outward-facing projections decompress if the first portion is rotated to the plurality of concave indentations; and the plurality of outward-facing projections provide a constant outward radial force on the first bearing surface.

{D6} The handle with a rotatable hanger of the above paragraph {D1} plus the following features: the first bearing surface is cylindrical in shape; the second bearing surface is cylindrical in shape; and the second bearing surface does not rotate with respect to the handle portion.

{D7} The handle with a rotatable hanger of the above paragraph {D1} plus the following features: the at least one inward-facing protrusion located on the third surface comprises a plurality of inward-facing protrusions at spaced-apart positions around the third surface; and the at least one notch located on the fourth surface comprises a plurality of spaced-apart notches around the fourth surface.

{E1} A fastener driving tool, comprising: an outer housing portion; a handle portion; a fastener exit portion; a movable hanger that is rotatable about the handle portion, the hanger including a first ring portion that exhibits a plurality of concave indentations spaced-apart along an inward-facing first bearing surface, and a second ring portion that exhibits a plurality of outward-facing flexible projections spaced-apart along an outward-facing second bearing surface; the first ring exhibiting a first extension portion that extends in a direction that is substantially perpendicular with respect to a longitudinal axis of the tool; and exhibiting a second extension portion that extends from the first extension portion in a direction that is substantially perpendicular with respect to the first extension portion; wherein: (a) the first bearing surface mates to the second bearing surface, and the first ring is rotatable about the second bearing surface; (b) the plurality of outward-facing projections mate to the plurality of concave indentations, if the first bearing surface is rotated to a detent position with respect to the second bearing surface; and (c) if the first bearing surface is rotated to the detent position, then the outward-facing projections hold the first ring portion in place with respect to the second ring portion.

{E2} The fastener driving tool of the above paragraph {E1} plus the following features: the plurality of outward-facing projections are angled, and exhibit elastic properties; the plurality of outward-facing projections compress when the first bearing surface is rotated around the second bearing surface; and the plurality of outward-facing projections decompress when the first bearing surface is rotated to the first detent position.

{E3} The fastener driving tool of the above paragraph {E2} plus the following features: the plurality of outward-facing projections are arranged in pairs, and each of the pairs has a small air gap therebetween.

{E4} The fastener driving tool of the above paragraph {E3} plus the following features: if the plurality of outward-facing projections are positioned within the plurality of concave indentations, and thereby in a detent position, then if sufficient additional rotational force is applied to at least one of the movable hanger and the handle portion, then the detent state will be overcome, again allowing rotation between the movable hanger and the handle portion.

{E5} The fastener driving tool of the above paragraph {E4} plus the following features: each of the concave indentations is sufficient smooth to allow the plurality of outward-facing flexible projections to slide along the inward-facing first bearing surface without catching, just as the detent state is being overcome.

{E6} The fastener driving tool of the above paragraph {E1} plus the following features: the first and second bearing surfaces are cylindrical in shape.

{E7} The fastener driving tool of the above paragraph {E1} plus the following features: at least one inward-facing protrusion located on the second ring portion; at least one slot in an outer surface of the handle portion; wherein: the at least one inward-facing protrusion mates into the at least one slot to lock the second ring portion to the handle portion, thereby preventing rotational movement therebetween.

Note that some of the embodiments illustrated herein do not have all of their components included on some of the figures herein, for purposes of clarity. To see examples of such outer housings and other components, especially for earlier designs, the reader is directed to other U.S. patents and applications owned by Senco. Similarly, information about "how" the electronic controller operates to control the functions of the tool is found in other U.S. patents and applications owned by Senco. Moreover, other aspects of the present tool technology may have been present in earlier fastener driving tools sold by the Assignee, Kyocera Senco Industrial Tools, Inc., including information disclosed in previous U.S. patents and published applications. Examples of such publications are patent numbers U.S. Pat. Nos. 6,431,425; 5,927,585; 5,918,788; 5,732,870; 4,986,164; 4,679,719; 8,011,547, 8,267,296, 8,267,297, 8,011,441, 8,387,718, 8,286,722, 8,230,941, and 8,763,874; also published U.S. patent application No. 2016/0288305 and published U.S. patent application, No. 2018/0178361. These documents are incorporated by reference herein, in their entirety.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A fastener driving tool, comprising:

an outer housing portion;

a handle portion which includes an annular groove about a perimeter of the handle portion;

a magazine that stores fasteners;

a fastener exit portion; and a movable hanger that is rotatable around said handle portion;

wherein:

said movable hanger exhibits a minimum rotational travel from at least a first position at a first side of said tool to at least a second position at a second, opposite side of said tool;

said movable hanger, if rotated to said first position, is sized and shaped to provide an open space between said movable hanger and said outer housing portion at the first side of the tool, and between said movable hanger and said handle portion at the first side of the tool; and said movable hanger, if rotated to said second position, is sized and shaped to provide an open space between said movable hanger and said outer housing portion at a second side of the tool, and between said movable hanger and said handle portion at the second side of the tool;

and wherein: said movable hanger is of a two-piece construction, comprising:

(a) a first partial ring portion having an inner shape of a semi-circle;

(b) an extension portion that extends from the first partial ring portion along a first direction, then bends to further extend along a second direction that is substantially perpendicular to the first direction, thereby forming the open space at either the first side or the second side of the tool;

(c) a second partial ring portion having an inner shape of a semi-circle, wherein: the inner shape of the semi-circle of the first and second partial ring portions are configured to enable the first and second partial ring portions to directly mate with one another within the annular groove of said handle portion; and (d) at least one fastener for holding said first and second partial ring portions together, so as to form a complete circle that fits into said annular groove around said handle portion.

2. The fastener driving tool of claim 1, wherein:

said movable hanger is rotatably mounted in said annular groove in a tight constrainment that allows only rotation along a flat plane and does not wobble enough to fall off a rafter after being hung on that rafter.

3. The fastener driving tool of claim 1, wherein:

the at least one fastener comprises two separate fasteners that each fit into at least one of a plurality of openings in at least one of a first surface of the first partial ring portion and a second surface of the second partial ring portion of the movable hanger.

4. The fastener driving tool of claim 1, wherein:

the open space exhibits a minimum dimension of at least 1.5 inches in a first direction and of at least 3.5 inches in a second, perpendicular direction.

5. The fastener driving tool of claim 2, wherein:

once joined as said complete circle, the first and second partial ring portions fit into said annular groove so as to be rotatable.

6. The fastener driving tool of claim 1, wherein the extension portion is narrower than the first and second partial ring portions.

7. The fastener driving tool of claim 1, wherein the first partial ring portion includes a first pair of mating surfaces and the second partial ring portion includes a second pair of mating surfaces, wherein each of a first end surfaces of a first pair of end surfaces are configured to mate with each of a second end surfaces of a second pair of end surfaces.

8. The fastener driving tool of claim 1, wherein both the first partial ring portion includes a pair of first mating surfaces, wherein a first distance measured between each of the first mating surfaces is greater than a width of a narrowest portion of the annular groove before and after installation of the pair of first mating surfaces and the second partial ring portion includes a pair of second mating surfaces, wherein a second distance measured between each of the second mating surfaces is greater than the width of the narrowest portion of the annular groove before and after installation of the pair of second mating surfaces.

9. The fastener driving tool of claim 8, wherein the first distance is approximately the same as the second distance.

10. A method for hanging a fastener driving tool on a solid rectangular-shaped surface, said method comprising:

(a) providing a fastener driving tool, including:
   (i) an outer housing portion;
   (ii) a handle portion;
   (iii) a magazine that stores fasteners;
   (iv) a fastener exit portion; and
   (v) a movable hanger that is rotatable about said handle portion, said movable hanger including an extension portion that is sized and shaped to create an open space between said movable hanger and at least one of the outer housing portion, the handle portion, and the magazine, wherein the open space is configured to fit around a solid rectangular-shaped object;

(b) rotating said movable hanger around said handle portion to a first rotational position at a first side of said tool, and hanging said tool on said solid rectangular-shaped object, using the open space created by the extension portion of said movable hanger; and (c) later, rotating said movable hanger around said handle portion to a second rotational position at a second, opposite side of said tool, and hanging said tool on said solid rectangular-shaped object, using the open space created by the extension portion of said movable hanger;

and wherein, said movable hanger comprises:

(a) a first partial ring portion having an inner shape of a semi-circle, wherein: the first partial ring portion includes a first pair of end surfaces;

(b) said extension portion, which extends from the first partial ring portion along a first direction, then bends to further extend along a second direction;

(c) a second partial ring portion having an inner shape of a semi-circle, wherein: the second partial ring portion includes a second pair of end surfaces; and (d) at least one fastener for holding said first and second partial ring portions together, so as to form a complete circle that fits into around said handle portion, wherein: each of the first pair and second pair of end surfaces are configured to meet to form the complete circle.

11. The method of claim 10, wherein:

said movable hanger is rotatably mounted in an annular groove in a tight constrainment that allows only rotating along a flat plane and does not wobble enough to fall off a rafter after being hung on the rafter.

12. The method of claim 10, wherein:

the open space exhibits a minimum dimension of at least 1.5 inches in the first direction and of at least 3.5 inches in the second direction, which is perpendicular to the first direction.

13. The method of claim 10, wherein: the first partial ring portion includes a pair of a first end surfaces, each first end surface having a first opening and the second partial ring portion includes a second pair of end surfaces, each second end surface having a second opening, wherein the first and second openings are configured to receive a fastener that mechanically couples the first partial ring portion to the second partial ring portion.

14. A method for mounting a rotatable hanger to a fastener driving tool, said method comprising:

(a) providing a fastener driving tool, including:
   (i) an outer housing portion;
   (ii) a handle portion, which includes an annular groove about a perimeter of the handle portion;
   (iii) a magazine that stores fasteners; and
   (iv) a fastener exit portion;

(b) providing a rotatable hanger, said rotatable hanger including:
   (i) a first partial ring portion;
   (ii) a second partial ring portion;
   (iii) an extension portion, which extends from the first partial ring portion along a first direction, then bends to further extend along a second direction;

(c) mounting the rotatable hanger to the handle portion, comprising:
   (i) bringing the first partial ring portion against the annular groove, wherein: the first partial ring portion includes at least one first bore;

(ii) bringing the second partial ring portion against the annular groove, wherein: the second partial ring portion includes at least one second bore; and (iii) applying at least one fastener to hold the first partial ring portion to the second partial ring portion, so that both the first and second partial ring portions are tightly held against the annular groove, wherein: the at least one fastener is configured to join the first partial ring portion to the second partial ring portion through at least one of the first and second bores.

15. The method of claim 14, wherein:

said at least one fastener fits into at least one opening in a surface of at least one of the first and second partial ring portions of the rotatable hanger.

16. The method of claim 14, further comprising:

(a) rotating said rotatable hanger to a first side of the tool, thereby creating a first open space between the rotatable hanger and at least one of the outer housing portion, the handle portion, and the magazine, wherein the first open space is configured to fit around a solid rectangular-shaped object; and (b) later, rotating said rotatable hanger to a second, opposite side of the tool, thereby creating a second open space between the rotatable hanger and at least one of the outer housing portion, the handle portion, and the magazine, wherein the second open space is configured to fit around said solid rectangular-shaped object.

17. The method of claim 16, wherein:

the first open space exhibits a minimum dimension of at least 1.5 inches in the first direction and of at least 3.5 inches in the second direction, which is perpendicular to the first direction; and the second open space exhibits a minimum dimension of at least 1.5 inches in the first direction and of at least 3.5 inches in the second direction, which is perpendicular to the first direction.

18. The method of claim 14, wherein:

said rotatable hanger is rotatably mounted in said annular groove in a tight constrainment that allows only rotation along a flat plane and does not wobble enough to fall off a rafter after being hung on a rafter.

* * * * *